(12) United States Patent
Takeda et al.

(10) Patent No.: US 7,969,542 B2
(45) Date of Patent: Jun. 28, 2011

(54) LIQUID CRYSTAL PANEL AND LIQUID CRYSTAL DISPLAY APPARATUS

(75) Inventors: Kentarou Takeda, Osaka (JP); Junichi Nagase, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 137 days.

(21) Appl. No.: 12/516,264

(22) PCT Filed: Nov. 15, 2007

(86) PCT No.: PCT/JP2007/072176
§ 371 (c)(1),
(2), (4) Date: May 26, 2009

(87) PCT Pub. No.: WO2008/065899
PCT Pub. Date: Jun. 5, 2008

(65) Prior Publication Data
US 2010/0066958 A1    Mar. 18, 2010

(30) Foreign Application Priority Data

Nov. 27, 2006 (JP) ................ 2006-318629
Jun. 5, 2007 (JP) ................ 2007-149328
Oct. 11, 2007 (JP) ................ 2007-265642

(51) Int. Cl.
*G02F 1/1335* (2006.01)
(52) U.S. Cl. ............ 349/118; 349/56; 349/58; 349/84; 349/117
(58) Field of Classification Search .......... 349/56, 349/58, 84, 117, 118
See application file for complete search history.

(56) References Cited

U.S. PATENT DOCUMENTS

| 6,238,753 | B1 * | 5/2001 | Ezzell et al. ........... 428/1.3 |
| 7,012,663 | B2 | 3/2006 | Ono et al. |
| 7,038,744 | B2 | 5/2006 | Kuzuhara et al. |

(Continued)

FOREIGN PATENT DOCUMENTS

JP    2002-182036 A    6/2002

(Continued)

OTHER PUBLICATIONS

International Search Report of PCT/JP2007/072176, date of mailing Dec. 25, 2007.

*Primary Examiner* — Jennifer Doan
(74) *Attorney, Agent, or Firm* — Westerman, Hattori, Daniels & Adrian, LLP

(57) ABSTRACT

A liquid crystal panel includes a liquid crystal cell having a liquid crystal layer containing liquid crystal molecules that are vertically aligned in an absence of a voltage; a first optical compensation layer having a relationship of Nz =1 to 2.5 and a relationship of $Re_1(380) < Re_1(550) < Re_1(780)$; a second optical compensation layer having a relationship of nx = ny >nz and a relationship of $Re_2(380) > Re_2(550) > Re_2(780)$; a first polarizer; a third optical compensation layer having a relationship of Nz =1 to 2.5 and a relationship of $Re_3(380) < Re_3(550) < Re_3(780)$; a fourth optical compensation layer having a relationship of nx =ny >nz and a relationship of $Re_4(380) > Re_4(550) > Re_4(780)$; and a second polarizer wherein: the first optical compensation layer, the second optical compensation layer, and the first polarizer are placed on one side of the liquid crystal cell; and the third optical compensation layer, the fourth optical compensation layer, and the second polarizer are placed on the other side of the liquid crystal cell.

11 Claims, 17 Drawing Sheets

U.S. PATENT DOCUMENTS

| | | |
|---|---|---|
| 7,050,132 B2 * | 5/2006 | Okamoto et al. ............. 349/114 |
| 7,184,112 B2 | 2/2007 | Kuzuhara et al. |
| 7,319,500 B2 | 1/2008 | Yoshida et al. |
| 2001/0030726 A1 | 10/2001 | Yoshida et al. |
| 2003/0156235 A1 | 8/2003 | Kuzuhara et al. |
| 2004/0239852 A1 | 12/2004 | Ono et al. |
| 2006/0082703 A1 | 4/2006 | Kuzuhara et al. |
| 2006/0098145 A1 | 5/2006 | Kim et al. |
| 2007/0116898 A1 | 5/2007 | Kuzuhara et al. |

FOREIGN PATENT DOCUMENTS

| | | |
|---|---|---|
| JP | 2003-270442 A | 9/2003 |
| JP | 2004-35688 A | 2/2004 |
| JP | 3648240 B2 | 5/2005 |
| JP | 2005-521920 A | 7/2005 |
| WO | 03/032060 A1 | 4/2003 |
| WO | 03/085949 A2 | 10/2003 |

* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus having the liquid crystal panel.

BACKGROUND ART

A liquid crystal display apparatus of a vertical alignment mode turns on/off light from a backlight for each pixel using a birefringence of a liquid crystal and a polarization. In such a liquid crystal display apparatus, liquid crystal molecules are aligned vertically under no voltage application. Therefore, a black display can be performed by setting polarizing plates placed on both sides of a liquid crystal cell so that absorption axes of polarizers are perpendicular to each other. A white display can be performed as follows. The liquid crystal is inclined by applying a voltage in each of the directions of 45°, 135°, 225°, and 315° from the direction of the absorption axes of the polarizers, whereby polarization direction of linearly polarized light is rotated by 90° due to the birefringence of the liquid crystal, and consequently, light is transmitted therethrough, and a white display can be performed. However, this is limited to the case where a screen is viewed in a front direction. In the case of a black display, when a screen is viewed in an oblique direction, for example, when a screen is viewed in a direction of 45° from absorption axes of polarizers of polarizing plates, liquid crystal appears to be aligned obliquely, and not being aligned vertically. Therefore, light in this direction has its polarization state changed due to the birefringence of the liquid crystal, and cannot be absorbed completely by the polarizing plates. Consequently, light leakage occurs.

Further, the polarizing plates are placed so that the absorption axes of the polarizers are perpendicular to each other. However, as the viewing angle is inclined toward an oblique direction, the angle formed by absorption axes becomes apparently shifted from perpendicular. Consequently, light leakage occurs.

Therefore, in a liquid crystal display apparatus of a vertical alignment mode, an optical compensation plate that compensates for the birefringence of a liquid crystal and the axis shift of a polarizer of a polarizing plate, for example, a biaxial retardation plate is used (e.g., see Patent Document 1).

However, if an optical compensation plate to be used is targeted for light having a particular wavelength, not all light having various wavelengths output from a backlight is sufficiently compensated for, so light leakage occurs at a certain wavelength. Further, a transmittance varies depending upon the wavelength, so a phenomenon (so-called color shift) occurs in which color appears to be changed when a viewing angle is changed. In order to reduce these phenomena, there is a demand for compensating for visible light over an entire visible wavelength range.

In order to satisfy the above demand, it is disclosed that visible light is compensated for, using a compensation layer which has a negative thickness direction retardation (nx=ny>nz) having positive refractive index wavelength dispersion (positive dispersion) and a retardation plate which has negative refractive index wavelength dispersion (reverse dispersion) compensating for the axis shift of a polarizer of a polarizing plate (Patent Document 2). However, according to this technology, light leakage or a color shift is not sufficiently suppressed. Further, with the liquid crystal panel described in Patent Document 2, unevenness caused by attachment is large, which does not withstand the practical use in many cases.

Patent Document 1: JP 2003-270442 A
Patent Document 2: JP 3648240 B

DISCLOSURE OF THE INVENTION

Problem to be Solved by the Invention

The present invention has been made in view of solving the conventional problems described above, and an object of the present invention is therefore to provide a liquid crystal panel and a liquid crystal display apparatus which can contribute to the reduction in thickness, realize a high contrast while enhancing viewing angle characteristics, suppress a color shift, and satisfactorily prevent the light leakage in a black display.

Means for Solving the Problems

A liquid crystal panel of the present invention includes: a liquid crystal cell having a liquid crystal layer containing liquid crystal molecules that are vertically aligned in an absence of a voltage; a first optical compensation layer having a relationship of Nz=1 to 2.5 and a relationship of $Re_1(380)<Re_1(550)<Re_1(780)$; a second optical compensation layer having a relationship of nx=ny>nz and a relationship of $Re_2(380)>Re_2(550)>Re_2(780)$; a first polarizer; a third optical compensation layer having a relationship of Nz=1 to 2.5 and a relationship of $Re_3(380)<Re_3(550)<Re_3(780)$; a fourth optical compensation layer having a relationship of nx=ny>nz and a relationship of $Re_4(380)>Re_4(550)>Re_4(780)$; and a second polarizer wherein: the first optical compensation layer, the second optical compensation layer, and the first polarizer are placed on one side of the liquid crystal cell; the third optical compensation layer, the fourth optical compensation layer, and the second polarizer are placed on the other side of the liquid crystal cell; and the first optical compensation layer and the second optical compensation layer, and the third optical compensation layer and the fourth optical compensation layer are placed in a symmetric positional relationship with respect to the liquid crystal cell.

In a preferred embodiment of the invention, the first optical compensation layer, the second optical compensation layer, and the first polarizer are placed on one side of the liquid crystal cell in the stated order from the liquid crystal cell; and the third optical compensation layer, the fourth optical compensation layer, and the second polarizer are placed on the other side of the liquid crystal cell in the stated order from the liquid crystal cell.

In a preferred embodiment of the invention, the second optical compensation layer, the first optical compensation layer, and the first polarizer are placed on one side of the liquid crystal cell in the stated order from the liquid crystal cell; and the fourth optical compensation layer, the third optical compensation layer, and the second polarizer are placed on the other side of the liquid crystal cell in the stated order from the liquid crystal cell.

In a preferred embodiment of the invention, the first optical compensation layer and the third optical compensation layer each have a photoelastic coefficient of $70 \times 10^{-12}$ $(m^2/N)$ or less.

In a preferred embodiment of the invention, the first optical compensation layer and the third optical compensation layer each have a relationship of $Re(780)/Re(550)>1.1$.

In a preferred embodiment of the invention, the first optical compensation layer and the third optical compensation layer are formed of one of a cellulose-based material and a polyester-based material.

In a preferred embodiment of the invention, the first optical compensation layer and the third optical compensation layer are formed of a material having a non-aromatic cyclic structure and an ester group.

In a preferred embodiment of the invention, the second optical compensation layer and the fourth optical compensation layer each have a relationship of $Re(780)/Re(550)<0.95$.

In a preferred embodiment of the invention, the second optical compensation layer and the fourth optical compensation layer each have a thickness direction retardation Rth of 20 nm or more.

In a preferred embodiment of the invention, the first optical compensation layer and the third optical compensation layer are polymer films stretched in a width direction.

According to another aspect of the present invention, a liquid crystal display apparatus is provided. The liquid crystal display apparatus includes the liquid crystal panel.

EFFECTS OF THE INVENTION

According to the present invention, a liquid crystal panel and a liquid crystal display apparatus can be provided, which can contribute to the reduction in thickness, realize a high contrast while enhancing viewing angle characteristics, suppress a color shift, and satisfactorily prevent the light leakage in a black display.

Such an effect can be realized by a liquid crystal panel in which a first optical compensation layer having a relationship of Nz=1 to 2.5 and a relationship of $Re_1(380)<Re_1(550)<Re_1(780)$, a second optical compensation layer having a relationship of $nx=ny>nz$ and a relationship of $Re_2(380)>Re_2(550)>Re_2(780)$, and a first polarizer are placed on one side of a liquid crystal cell with a predetermined positional relationship, and a third optical compensation layer having a relationship of Nz=1 to 2.5 and a relationship of $Re_3(380)<Re_3(550)<Re_3(780)$, a fourth optical compensation layer having a relationship of $nx=ny>nz$ and a relationship of $Re_4(380)>Re_4(550)>Re_4(780)$, and a second polarizer are placed on the other side of the liquid crystal cell with a predetermined positional relationship.

Figure 1A:
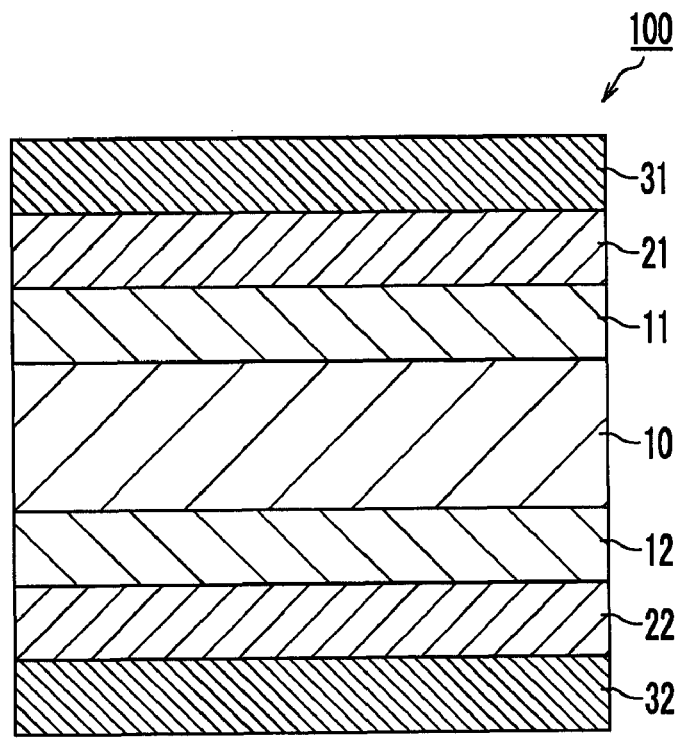
FIG. 1 Schematic sectional views of a liquid crystal panel according to a preferred embodiment of the present invention.

DESCRIPTION OF SYMBOLS 10 liquid crystal cell
11 first optical compensation layer 12 third optical compensation layer
21 second optical compensation layer
22 fourth optical compensation layer
31 first polarizer
32 second polarizer
100 liquid crystal panel

BEST MODE FOR CARRYING OUT THE INVENTION

Definitions of Terms and Symbols

The definitions of terms and symbols of the specification of the present invention are as follows.

(1) The symbol "nx" refers to a refractive index in a direction providing a maximum in-plane refractive index (that is, a slow axis direction), and the symbol "ny" refers to a refractive index in a direction perpendicular to the slow axis in the same plane (that is, a fast axis direction). The symbol "nz" refers to a refractive index in a thickness direction. Further, the expression "nx=ny", for example, not only refers to a case where nx and ny are exactly equal but also includes a case where nx and ny are substantially equal. In this specification, the phrase "substantially equal" includes a case where nx and ny differ within a range providing no effects on overall polarizing characteristics of a liquid crystal display panel in practical use. Similarly, the expression "ny=nz", for example, not only refers to a case where ny and nz are exactly equal but also includes a case where ny and nz are substantially equal.

(2) The term "in-plane retardation Re" refers to an in-plane retardation value of a film (layer) measured at 23° C. by using light having a wavelength of 590 nm as far as not specified, particularly. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer). Re($\lambda$) refers to an in-plane retardation value measured at 23° C. by using light having a wavelength of $\lambda$ mm.

(3) The term "thickness direction retardation Rth" refers to a thickness direction retardation value measured at 23° C. by using light of a wavelength of 590 nm as far as not specified, particularly. Rth can be determined from an equation Rth=(nx−nz)×d, where nx and nz represent refractive indices of a film (layer) at a wavelength of 590 nm in a slow axis direction and a thickness direction, respectively, and d (nm) represents a thickness of the film (layer).

(4) Numerical subscripts "1" to "4" attached to terms and symbols described in the specification of the present invention represent first to fourth optical compensation layers, respectively.

(5) Nz coefficient
An Nz coefficient is obtained by the following Expression (1):

$$Nz=(nx-nz)/(nx-ny) \quad (1)$$

A. Liquid Crystal Panel
A-1. Overall Configuration of a Liquid Crystal Panel

A liquid crystal panel of the present invention includes a liquid crystal cell; a first optical compensation layer, a second optical compensation layer, and a first polarizer which are placed on one side of the liquid crystal cell; and a third optical compensation layer, a fourth optical compensation layer, and a second polarizer which are placed on the other side of the liquid crystal cell; in which the first optical compensation layer and the second optical compensation layer, and the third optical compensation layer and the fourth optical compensation layer are placed with a symmetric positional relationship with respect to the liquid crystal cell.

Figure 1B:
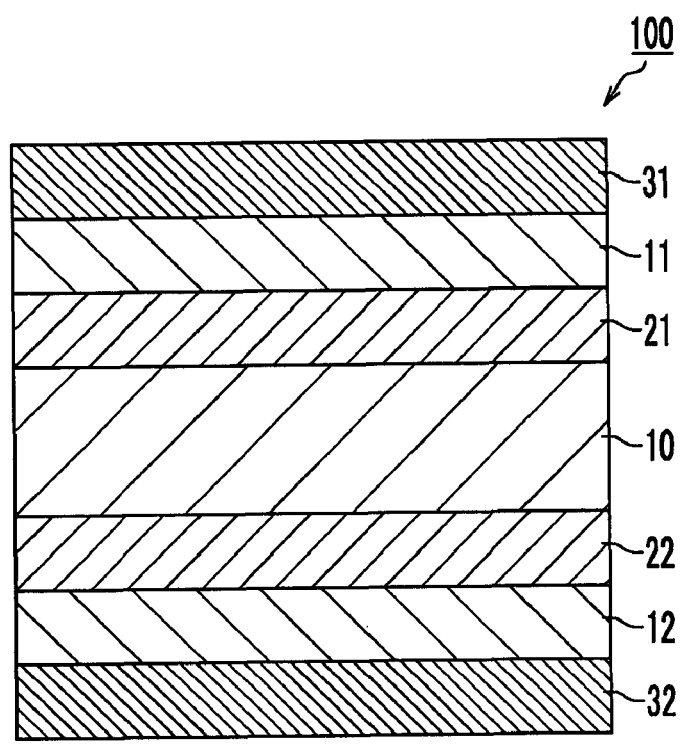

FIG. 1(a) is a schematic sectional view of a liquid crystal panel according to one preferred embodiment of the present invention. As shown in FIG. 1(a), a liquid crystal panel 100 includes a liquid crystal cell 10, a first optical compensation layer 11, a second optical compensation layer 21, and a first polarizer 31 which are placed on one side of the liquid crystal cell 10 in the stated order from the liquid crystal cell 10 side, a third optical compensation layer 12, a fourth optical compensation layer 22, and a second polarizer 32 which are placed on the other side of the liquid crystal cell 10 in the stated order from the liquid crystal cell 10 side. FIG. 1(b) is a schematic sectional view of a liquid crystal panel according to another preferred embodiment of the present invention. As shown in FIG. 1(b), the liquid crystal panel 100 includes the liquid crystal cell 10, the second optical compensation layer 21, the first optical compensation layer 11, and the first polarizer 31 which are placed on one side of the liquid crystal cell 10 in the stated order from the liquid crystal cell 10 side, the fourth optical compensation layer 22, the third optical compensation layer 12, and the second polarizer 32 which are placed on the other side of the liquid crystal cell 10 in the stated order from the liquid crystal cell 10 side.

The first optical compensation layer 11 and the third optical compensation layer 12 have a relationship of Nz=1 to 2.5 and a relationship of $Re_{1(3)}(380)<Re_{1(3)}(550)<Re_{1(3)}(780)$ respectively. Further, the second optical compensation layer 21 and the fourth optical compensation layer 22 have a refractive index ellipsoid of nx=ny>nz and a relationship of $Re_{2(4)}(380)>Re_{2(4)}(550)>Re_{2(4)}(780)$, respectively.

As described above, by placing the optical compensation layers having predetermined birefringence so that they are symmetric with respect to the liquid crystal cell, the optical inconvenience (for example, coloring) as viewed in an oblique direction, which is caused by the displacement of the angle formed by absorption axes of polarizers placed above and below the liquid crystal cell from the cross-Nicole)(90°), can be compensated for uniformly on above and below sides of the liquid crystal cell. Consequently, the viewing angle characteristics of the liquid crystal panel can be enhanced, a high contrast can be realized, a color shift can be suppressed, and the light leakage in a black display can be prevented satisfactorily.

In the liquid crystal panel 100 shown in FIG. 1, the first polarizer 31 and the second polarizer 32 are placed so that absorption axes thereof are substantially perpendicular to each other. Further, the first polarizer 31 is placed so that the absorption axis thereof is substantially perpendicular to a slow axis of the first optical compensation layer 11. The second polarizer 32 is placed so that the absorption axis thereof is substantially perpendicular to a slow axis of the third optical compensation layer 12. Note that in this specification, "substantially perpendicular" includes the case of 90°±3.0°, preferably 90°±1.0°, and more preferably 90°±0.5°.

Although not shown, each layer of the liquid crystal panel can be placed via any appropriate pressure-sensitive adhesive layer or an adhesive layer. Practically, on a side of the first polarizer 31 and/or the second polarizer 32 where the optical compensation layer is not formed (on a side opposite to the liquid crystal cell), any appropriate protective layer can be provided. Further, if required, on a side of the first polarizer 31 and/or the second polarizer 32 where the optical compensation layer is formed (on a side of the liquid crystal cell), any appropriate protective layer can be provided.

A-2. Liquid Crystal Cell

The liquid crystal cell 10 used in the present invention includes a pair of substrates 41 and 42 and a liquid crystal layer 43 as a display medium placed between the substrates 41 and 42. The liquid crystal layer 43 includes liquid crystal molecules that are vertically aligned under no voltage application. As such a liquid crystal cell, for example, there is a liquid crystal cell of a VA mode.

Figure 2A:
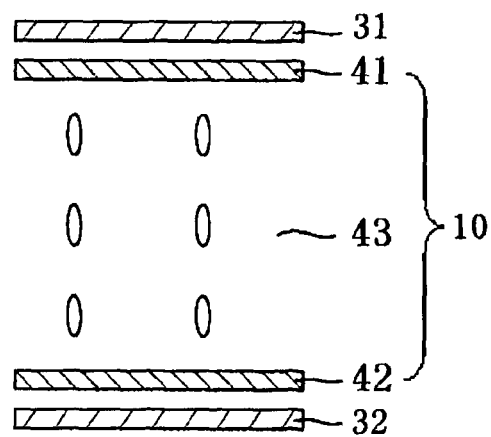
FIG. 2 Schematic sectional views illustrating an alignment state of liquid crystal molecules of a liquid crystal layer in a liquid crystal cell of a VA mode.
Figure 2B:
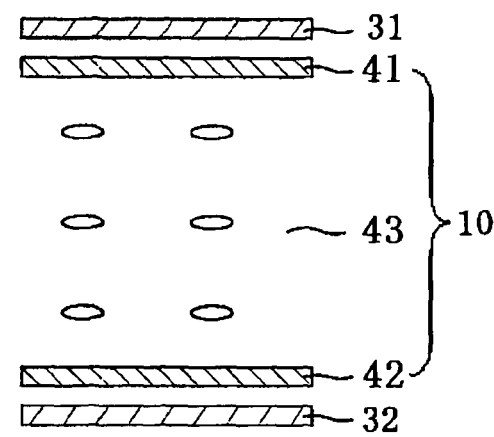

FIG. 2 is a schematic cross-sectional view illustrating an alignment state of liquid crystal molecules in a VA mode. As shown in FIG. 2(a), liquid crystal molecules are aligned vertically to the substrates 41, 42 without application of a voltage. Such vertical alignment can be realized by arranging nematic liquid crystal having negative dielectric anisotropy between the substrates each having a vertical alignment film formed thereon (not shown). When light enters from a surface of one substrate 41 in such a state, linear polarized light which passed through the first polarizer 31 enters the liquid crystal layer 43, and the incident light advances along a longitudinal direction of the vertically aligned liquid crystal molecules. No birefringence occurs in the longitudinal direction of the liquid crystal molecules, and thus the incident light advances without changing a polarization direction and is absorbed by the second polarizer 32 having an absorption axis perpendicular to that of the first polarizer 31. In this way, a dark state is displayed without application of a voltage (normally black mode). As shown in FIG. 2(b), longitudinal axes of the liquid crystal molecules are aligned parallel to the substrate surfaces when a voltage is applied between the electrodes. The liquid crystal molecules exhibit birefringence with respect to linear polarized light incident upon the liquid crystal layer 43 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the second polarizer 32, and a bright state is displayed. Upon termination of voltage application, the display is returned to a dark state by an alignment restraining force. An applied voltage is changed to control inclination of the liquid crystal molecules, so as to change an intensity of light transmission from the second polarizer 32. As a result, display of gradation can be realized.

A-3. First Optical Compensation Layer

The first optical compensation layer has a relationship of Nz=1 to 2.5, and a relationship of $Re_1(380) < Re_1(550) < Re_1(780)$. More specifically, the first optical compensation layer has a negative refractive index wavelength dispersion (reverse dispersion). The first optical compensation layer can preferably compensate for the axis shift of a polarizer of a polarizing plate.

An in-plane retardation $Re_1$ of the first optical compensation layer is preferably 20 to 180 nm, more preferably 25 to 160 nm, and still more preferably 30 to 140 nm.

A thickness direction retardation $Rth_1$ of the first optical compensation layer is preferably 20 to 200 nm, more preferably 30 to 180 nm, and still more preferably 40 to 150 nm.

An Nz coefficient of the first optical compensation layer is 1 or more, preferably 1.1 or more, and more preferably 1.3 or more. Further, the Nz coefficient of the first optical compensation layer is 2.5 or less, preferably 2.2 or less, more preferably 2.0 or less, and particularly preferably 1.8 or less. In the case where the Nz coefficient is in the above range, there is an effect that the axis shift of a polarizer of a polarizing plate can further preferably be compensated.

The first optical compensation layer has a photoelastic coefficient of preferably $70 \times 10^{-12}$ (m$^2$/N) or less, more preferably $60 \times 10^{-12}$ (m$^2$/N) or less, still more preferably $50 \times 10^{-12}$ (m$^2$/N) or less, still more preferably $40 \times 10^{-12}$ (m$^2$/N) or less, and particularly preferably $0.1 \times 10^{-12}$ to $30 \times 10^{-12}$ (m$^2$/N). In the case where the photoelastic coefficient is in the above range, the occurrence of retardation unevenness caused by tension during attachment to another optical element can be suppressed. Therefore, there can be an effect that a liquid crystal panel with light leakage being suppressed is obtained.

The first optical compensation layer has a relationship of preferably $Re_1(780)/Re_1(550) > 1.1$, more preferably $1.1 < Re_1(780)/Re_1(550) < 1.6$, and still more preferably $1.15 < Re_1(780)/Re_1(550) < 1.5$. In the case where the first optical compensation layer has the above relationship, a retardation value becomes constant in a wide range of visible light. Therefore, when such a first optical compensation layer is used for a liquid crystal display apparatus, a wavelength bias is unlikely to occur in light that leaks, and the color shift amount in an oblique direction of the liquid crystal display apparatus can be further decreased. In particular, when such a first optical compensation layer is used for a liquid crystal display apparatus, light leakage in a red region becomes small, which can prevent a display image from becoming reddish.

The first optical compensation layer has a relationship of preferably $Re_1(550)/Re_1(380) > 1.1$, more preferably $1.1 < Re_1(550)/Re_1(380) < 1.7$, and still more preferably $1.3 < Re_1(550)/Re_1(380) < 1.6$. In the case where the first optical compensation layer has the above relationship, a retardation value becomes constant in a wide range of visible light. Therefore, when such a first optical compensation layer is used for a liquid crystal display apparatus, a wavelength bias is unlikely to occur in light that leaks, and the color shift amount in an oblique direction of the liquid crystal display apparatus can be further decreased. In particular, when such a first optical compensation layer is used for a liquid crystal display apparatus, light leakage in a blue region becomes small, which can prevent a display image from becoming bluish.

A material for forming the first optical compensation layer is not particularly limited as long as an optical compensation layer having a relationship of Nz=1 to 2.5 and a relationship of $Re_1(380) < Re_1(550) < Re_1(780)$ is formed. Examples of such a material for forming the first optical compensation layer include a cellulose-based material, a polyester-based material, a polycarbonate-based material, a polyvinyl alcohol-based material, a polymethylmethacrylate-based material, a polystyrene-based material, an acrylonitrile/styrene copolymer, a styrene/maleimide anhydride copolymer, and a maleimide/styrene copolymer. Of those, a material having a non-aromatic cyclic structure and an ester group is preferred, and a cellulose-based material substituted with an acetyl group and a propionyl group and a polyester-based material having a non-aromatic cyclic structure are more preferred.

In the cellulose-based material substituted with an acetyl group and a propionyl group (hereinafter, merely abbreviated as a "cellulose-based material), the degree of substitution with an acetyl group can be represented by an "acetyl substitution degree (DSac)" that shows how many of three hydroxyl groups present in a repetition unit of cellulose is substituted with an acetyl group on average. In the above cellulose-based material, the degree of substitution with a propionyl group can be represented by a "propionyl substitution degree (DSpr)" that shows how many of three hydroxyl groups present in a repetition unit of cellulose is substituted with a propionyl group on average. The above acetyl substitution degree (DSac) and propionyl substitution degree (DSpr) can be obtained by a method described in [0016] to [0019] in JP 2003-315538 A.

In the above cellulose-based material, it is preferred that the acetyl substitution degree (DSac) and the propionyl substitution degree (DSpr) satisfy a relationship: $2.0 \leq DSac+DSpr \leq 3.0$. The lower limit value of DSac+DSpr is preferably 2.3 or more, and more preferably 2.6 or more. The upper limit value of DSac+DSpr is preferably 2.9 or less, and more preferably 2.8 or less. By setting the DSac+DSpr of the cellulose-based material in the above range, an optical film having desired optical properties can be obtained efficiently.

In the above cellulose-based material, it is preferred that the propionyl substitution degree (DSpr) satisfies a relationship: $1.0 \leq DSpr \leq 3.0$. The lower limit value of DSpr is preferably 2 or more, and more preferably 2.5 or more. The upper limit value of DSpr is preferably 2.9 or less, and more preferably 2.8 or less. By setting the DSpr of the cellulose-based material in the above range, an optical film having desired optical properties can be obtained efficiently.

The cellulose-based material may have another substituent excluding the acetyl group and the propionyl group. Examples of such a substituent include: an ester group such as a butyrate group; and an ether group such as an alkyl ether group or an aralkylene ether group.

A number average molecular weight of the cellulose-based material is preferably 5,000 to 100,000, and more preferably 10,000 to 70,000. The number average molecular weight thereof is adjusted within the above ranges, to thereby provide excellent productivity and favorable mechanical strength.

As a method of substituting by the acetyl group and propionyl group, any appropriate method may be employed. For example, a cellulose may be treated with a strong caustic soda solution to prepare an alkali cellulose, and the alkali cellulose may be acylated with a predetermined amount of a mixture of acetic anhydride and propionic anhydride. A part of acyl groups is hydrolyzed for adjusting the degree of substitution "DSac+DSpr".

The optical film (polymer film) formed of the cellulose-based material may contain any appropriate polymer material. Examples of such a polymer material include: a cellulose ester such as cellulose butyrate; and a cellulose ether such as methyl cellulose or ethyl cellulose. The optical film may contain additives such as a plasticizer, a heat stabilizer, and a UV stabilizer as required.

Examples of an optical film formed of the above cellulose-based material include those described in, for example, JP 2003-315538 A or U.S. Pat. No. 6,503,581 B1. Further, as such a film, a commercially available film, for example, a KA film (manufactured by Kaneka Corporation) can be used.

As the polyester-based material, any appropriate material can be adopted. For example, a polyester resin having a non-aromatic cyclic structure and an ester group, which is obtained by polymerizing a dicarboxylic acid component having a non-aromatic cyclic structure and a diol component, is preferably used.

By stretching an optical film formed of the above cellulose-based material or the above polyester-based material by appropriately selecting stretching conditions (e.g., a stretching temperature, a stretch ratio, a stretching direction), a stretching method, and the like, a first optical compensation layer having the above desired optical properties (e.g., a refractive index ellipsoid, an in-plane retardation, a thickness direction retardation) can be obtained.

As a stretching method, any appropriate stretching method such as a longitudinal uniaxial stretching method, a transverse uniaxial stretching method, a longitudinal/transverse simultaneous biaxial stretching method, and a longitudinal and transverse sequential biaxial stretching method can be adopted. The stretching direction may be a film longitudinal direction (MD direction), and a film width direction (TD direction). In the case where the stretching direction is a film width direction (TD direction), the resultant film can be attached to another roll-shaped optical element by roll-to-roll, and the productivity can be enhanced remarkably, which is advantageous in industrial production.

In the case where the first optical compensation layer is formed by stretching an optical film (polymer film) formed of the above cellulose-based material or the above polyester-based material, the stretching temperature is preferably 130° C. to 170° C., and more preferably 140° C. to 150° C. The stretch ratio is preferably 1.5 to 2.5 times, and more preferably 1.9 to 2.3 times. The thickness of a stretched film to be formed is preferably 30 to 70 μm, and more preferably 40 to 60 μm.

A-4. Second Optical Compensation Layer

The second optical compensation layer has a relationship of $nx=ny>nz$, and a relationship of $Re_2(380)>Re_2(550)>Re_2(780)$. More specifically, the second optical compensation layer is a negative C plate having a positive refractive index wavelength dispersion (positive dispersion). The second optical compensation layer can preferably compensate for the birefringence property of a liquid crystal cell (positive uniaxial birefringence having a positive dispersion: positive C plate component).

In this specification, "nx=ny" includes the case where nx and ny are substantially equal to each other, as well as the case where nx and ny are strictly equal to each other. Therefore, the second optical compensation layer can have an in-plane retardation Re, and can also have a slow axis. An in-plane retardation $Re_2$ of the second optical compensation layer is preferably 0 to 20 nm, more preferably 0 to 5 nm, and still more preferably 0 to 3 nm.

A thickness direction retardation $Rth_2$ of the second optical compensation layer is preferably 20 nm or more, more preferably 30 to 160 nm, and still more preferably 70 to 160 nm. If $Rth_2$ is in the above range, the birefringence property (positive uniaxial birefringence having a positive dispersion: positive C plate component) of a liquid crystal cell can be preferably compensated for.

The second optical compensation layer also has a relationship of preferably $Re_2(780)/Re_2(550)<0.95$, more preferably $0.8<Re_2(780)/Re_2(550)<0.95$, and still more preferably $0.85<Re_2(780)/Re_2(550)<0.95$. In the case where the second optical compensation layer has the above relationship, a retardation value becomes constant in a wide range of visible light. Therefore, in the case of using such a second optical compensation layer for a liquid crystal display apparatus, a wavelength bias is unlikely to occur in light that leaks, and the color shift amount in an oblique direction of the liquid crystal display apparatus can be decreased further. In particular, when such a second optical compensation layer is used for a liquid crystal display apparatus, light leakage in a red region becomes small, which can prevent a display image from becoming reddish.

The second optical compensation layer also has a relationship of preferably $Re_2(550)/Re_2(380)<0.95$, more preferably $0.7<Re_2(550)/Re_2(380)<0.9$, and still more preferably $0.75<Re_2(550)/Re_2(380)<0.85$. In the case where the second optical compensation layer has the above relationship, a retardation value becomes constant in a wide region of visible light. Therefore, in the case of using such a second optical compensation layer for a liquid crystal display apparatus, a wavelength bias is unlikely to occur in light that leaks, and the color shift amount in an oblique direction of the liquid crystal display apparatus can be decreased further. In particular, when such a second optical compensation layer is used for a liquid crystal display apparatus, light leakage in a blue region becomes small, which can prevent a display image from becoming bluish.

Examples of the second optical compensation layer include: an optically transparent layer made of a polymer selected from the group including polyamide, polyimide, polyester, poly(etherketone), poly(amideimide), and poly(esterimide); a layer made of a biaxially aligned polymer film; a layer in which a cholesteric alignment state of nematic liquid crystal is fixed; a layer in which a columnar alignment or nematic alignment of discotic liquid crystal is fixed; and a layer in which negative uniaxial crystal is aligned in a plane.

As polyamide, polyimide, polyester, poly(etherketone), poly(amideimide), or poly(esterimide) capable of forming the second optical compensation layer, polymers described in [0018] to [0072] of JP 2004-46065 A are preferred since they are excellent in heat resistance, chemical resistance, and transparency, and have high rigidity. Of those, for example, soluble polyimide (see JP 8-511812 A) formed of an aromatic dianhydride and an aromatic polydiamine can be preferably used owing to high transparency, high alignment property, and high stretchability.

By applying the above polymer onto, for example, a resin film or sheet, followed by solidifying, the second optical compensation layer can be formed. The above polymer can form a film that exhibits an optical uniaxial property of nx=ny>nz owing to its own property irrespective of the alignment of a substrate, unlike a liquid crystal material.

In the case where polyimide is used as the above polymer, a applying method is not particularly limited, and any method can be used. For example, a method of applying a polyimide melted by heating or a solution of polyimide dissolved in a solvent such as cyclohexanone to a PET film or the like to a thickness of 10 to 30 μm can be used. Then, the obtained applying film is, for example, naturally dried (air-dried) or heated at 80° C. to 120° C. for 8 to 12 minutes to solidify polyimide on the above film, whereby a second optical compensation layer can be formed.

The thickness of an optically transparent layer made of the above polymer is preferably 0.1 to 10 μm, and more preferably 1 to 5 μm. Thus, the second optical compensation layer formed of the above polymer can suitably compensate for the birefringence of a liquid crystal cell and contribute to reduction in thickness of a liquid crystal panel.

It is desired that a layer in which a cholesteric alignment state of nematic liquid crystal is fixed (hereinafter, referred to as a "cholesteric alignment solidified layer") does not have coloring or the like in a visible light region. More specifically, it is preferred that selectively reflected light of cholesterically aligned liquid crystal be not in a visible light region. Selective reflection is determined uniquely by the cholesteric chiral pitch and the refractive index of liquid crystal. Although the value of a center wavelength of selective reflection may be in a near-infrared region, it is more preferred that the value be in an ultraviolet region of 350 nm or less so as to avoid the influence of optical rotation.

The above cholesteric alignment solidified layer can be formed, for example, by twisting a liquid crystal material under the condition of exhibiting a liquid crystal phase with a chiral agent to align the liquid crystal material in a cholesteric structure (spiral structure), and subjecting the liquid crystal material to polymerization or cross-linking under such a state, thereby fixing the alignment (cholesteric structure) of the liquid crystal material.

A specific example of the above cholesteric alignment solidified layer includes a cholesteric alignment solidified layer described in JP 2003-287623 A.

The thickness of the above cholesteric alignment solidified layer is preferably 0.1 to 10 μm, and more preferably 1 to 5 μm. Thus, the second optical compensation layer that is a cholesteric alignment solidified layer can suitably compensate for the birefringence of a liquid crystal cell and contribute to reduction in thickness of a liquid crystal panel.

A layer in which a columnar alignment or nematic alignment state of discotic liquid crystal is fixed can be formed by, for example, allowing a columnar phase or a nematic phase to be expressed in a discotic liquid crystal material having a negative uniaxial property such as compounds of phthalocyanines or triphenylenes having a spread of molecular structure in a plane. Specifically, for example, a layer in which columnar alignment of discotic liquid crystal is fixed can be obtained by a method described in JP 09-117983 A.

As a layer in which negative uniaxial crystal is aligned in a plane, for example, those described in JP 06-82777 A are used.

As a layer made of biaxially aligned polymer film, for example, there is a polymer film formed by a method of biaxially stretching a polymer film having positive refractive index anisotropy with an appropriate balance, a method of pressing a thermoplastic resin, a method of cutting out a film from parallel aligned crystal body, and the like.

An example of the method of biaxially stretching a polymer film having positive refractive index anisotropy with an appropriate balance includes simultaneous or sequential biaxial stretching of a film made of a norbornene-based resin under the following conditions. More specifically, there is a method of stretching a film at a stretching temperature of preferably 120° C. to 180° C., more preferably 130° C. to 170° C. by a longitudinal stretch ratio of preferably 1.2 to 3 times, more preferably 1.5 to 2.5 times, and a transverse stretch ratio of preferably 1.2 to 3 times, more preferably 1.5 to 2.5 times.

A-5. Third Optical Compensation Layer

The third optical compensation layer has a relationship of Nz=1 to 2.5, and a relationship of $Re_3(380)<Re_3(550)<Re_3(780)$. More specifically, the third optical compensation layer has a negative refractive index wavelength dispersion (reverse dispersion). The third optical compensation layer can suitably compensate for the axis shift of a polarizer of a polarizing plate.

Regarding the third optical compensation layer, the description in the section A-3 can be applied. The third optical compensation layer may be the same as or different from the first optical compensation layer. Preferably, the third optical compensation layer is formed of the same material as that of the first optical compensation layer, and has the same thickness as that of the first optical compensation layer.

A-6. Fourth Optical Compensation Layer

The fourth optical compensation layer has a relationship of nx=ny>nz, and a relationship of $Re_4(380)>Re_4(550)>Re_4(780)$. More specifically, the fourth optical compensation layer is a negative C plate having a positive refractive index wavelength dispersion (positive dispersion). The fourth optical compensation layer can suitably compensate for the birefringence (positive uniaxial birefringence having a positive dispersion: positive C plate component) of a liquid crystal cell.

Regarding the fourth optical compensation layer, the description in the section A-4 can be applied. The fourth optical compensation layer may be the same as or different from the second optical compensation layer. Preferably, the fourth optical compensation layer is formed of the same material as that of the second optical compensation layer and has the same thickness as that of the second optical compensation layer.

A-7. Polarizer

As the polarizer, any suitable polarizers may be employed depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 1 to 80 µm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

A-8. Other Components

A-8-1. Protective Layer

As the protective layer, any appropriate film which can be used as a protective layer for a polarizer may be employed. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. To be specific, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin, and a glassy polymer are preferable, and TAC is more preferable.

It is preferable that the protective layer be transparent and have no color. Further, it is preferable that the protective layer substantially has optical isotropy. In one embodiment, the protective layer has an in-plane retardation of 0 to 10 nm and a thickness direction retardation of 0 to 10 nm.

As a thickness of the protective layer, any appropriate thickness can be adopted. To be specific, the thickness of the protective layer is preferably 5 mm or less, more preferably 1 mm or less, particularly preferable 1 to 500 µm, and most preferably 5 to 150 µm.

The protective layer provided on the outer side of the polarizer (that is, the opposite side to the optical compensation layer) may be subjected to hard coat treatment, antireflection treatment, anti-sticking treatment, anti-glare treatment, or the like as required.

A-8-2. Pressure-Sensitive Adhesive Layer

As a pressure-sensitive adhesive forming a pressure-sensitive adhesive layer, any appropriate pressure-sensitive adhesive can be adopted. Specific examples thereof include a solvent type pressure-sensitive adhesive, a non-aqueous emulsion type pressure-sensitive adhesive, an aqueous pressure-sensitive adhesive, and a hotmelt pressure-sensitive adhesive. Of those, a solvent type pressure-sensitive adhesive containing an acrylic polymer as a base polymer is preferably used.

The thickness of the above pressure-sensitive adhesive layer can be appropriately set depending upon the use purpose, the adhesion strength, and the like. Specifically, the thickness of the pressure-sensitive adhesive layer is preferably 1 µm to 100 µm, more preferably 5 µm to 50 µm, and still more preferably 10 µm to 30 µm.

A-8-3. Adhesive Layer

As an adhesive forming an adhesive layer, typically, there is a curable adhesive. Typical examples of the curable adhesive include a photo-curable adhesive such as a UV-curable adhesive, a moisture-curable adhesive, and a thermosetting adhesive.

The applying amount of an adhesive between respective layers can be set appropriately depending upon the purpose. For example, the applying amount is preferably 0.3 to 3 ml, more preferably 0.5 to 2 ml, and still more preferably 1 to 2 ml per area ($cm^2$) with respect to a principal plane of each layer.

After applying, a solvent contained in the adhesive is volatilized by natural drying or heat drying, if required. The thickness of the adhesive layer thus obtained is preferably 0.1 to 20 µm, more preferably 0.5 to 15 µm, and still more preferably 1 to 10 µm.

The above pressure-sensitive adhesive or adhesive can be selected appropriately depending upon the kind of an adherend (optical element).

A-8-4. Other Optical Elements

The liquid crystal panel of the present invention may further include other optical elements. As such other optical elements, any appropriate optical elements can be adopted depending upon the purpose and the kind of a liquid crystal display apparatus. Specific examples of the other optical elements include a liquid crystal film, alight scattering film, a diffraction film, and another optical compensation layer (retardation film).

B. Method of Producing a Liquid Crystal Panel

The liquid crystal panel of the present invention can be produced, for example, by laminating each optical element via the above pressure-sensitive layer and adhesive layer. As laminating means, any appropriate means can be adopted. For example, a first optical compensation layer (third optical compensation layer), a second optical compensation layer (fourth optical compensation layer), and a polarizer can be punched to a predetermined size, and they can be placed so that angles formed by optical axes of respective layers are in a desired range, and can be laminated on a liquid crystal cell via a pressure-sensitive adhesive and an adhesive. Further, the second optical compensation layer (fourth optical compensation layer) can be formed directly on an adjacent layer, for example, a substrate that functions as a first optical compensation layer, a polarizer, or a protective layer. In this case, a pressure-sensitive adhesive layer or an adhesive layer for laminating these layers are not necessary, which can contribute to the reduction in thickness of a liquid crystal panel and the simplification of a laminating operation.

C. Liquid Crystal Display Apparatus

The liquid crystal panel of the present invention may be used in a liquid crystal display apparatus. The liquid crystal display apparatus may be used suitably for: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; on-vehicle devices such as a back monitor, a car navigation system monitor, and a car audio; display devices such as a commercial information monitor; security devices such as a surveillance monitor; and nursing care and medical devices such as a nursing monitor and a medical monitor, for example.

Hereinafter, although the present invention will be described more specifically by way of examples, the present invention is not limited thereto.

EXAMPLE 1

(Production of First Optical Compensation Layer)

Figure 3A:
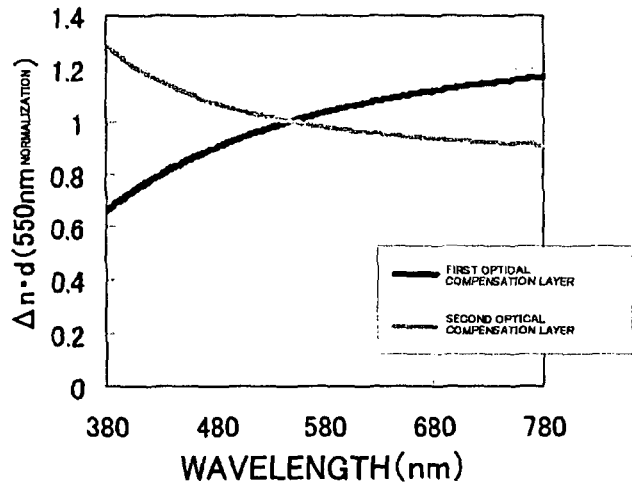
FIG. 3 (A) a graph showing refractive index wavelength dispersion property of a first optical compensation layer and a second optical compensation layer obtained in Example 1, (B) a graph showing refractive index wavelength dispersion property of a norbornene-based resin film used in Comparative Example 4, and (C) a graph showing refractive index wavelength dispersion property of a first optical compensation layer used in Example 6 and a first optical compensation layer used in Example 1.

A film obtained by subjecting a KA film (thickness: 80 μm, manufactured by Kaneka Corporation) to fixed-end transverse stretching with stretch ratio of 2 at 150° C. was used as a first optical compensation layer. The retardation of the obtained film was measured using a retardation measurement apparatus (KOBRA21ADH manufactured by Oji Scientific Instruments Co., LTD.) to find that $Re_1$ was 36 nm and $Rth_1$ was 50 nm (Nz coefficient=1.4). FIG. 3(A) shows a refractive index wavelength dispersion of the film. FIG. 3 are graphs obtained by extrapolation using a Cauchy approximate expression.

(Production of Second Optical Compensation Layer)

Polyimide was prepared in accordance with an established method, using 2,2'-bis(3,4-dicarboxylphenyl)hexafluoropropane (6FDA) and 2,2'-bis(trifluoromethyl)-4,4'-diaminobiphenyl(PFMB or TFMB) as starting materials. A solution prepared by dissolving the obtained polyimide in cyclohexanone so that the concentration of the polyimide became 15 wt % was applied to a PET film (thickness: 50 μm) to a thickness of 20 μm. Then, the resultant solution was dried at 100° C. for 10 minutes, whereby a polyimide film (thickness: about 3 μm) was obtained as a second optical compensation layer. The obtained polyimide film was transferred to a glass plate, and the retardation of the polyimide film was measured using a retardation measurement apparatus (KOBRA21ADH manufactured by Oji Scientific Instruments Co., LTD.) to find that $Re_2$ was 0.2 nm and $Rth_2$ was 100 nm. FIG. 3(A) shows a refractive index wavelength dispersion of the film.

(Other Optical Elements)

As a third optical compensation layer and a fourth optical compensation layer, the same films as those of the first optical compensation layer and the second optical compensation layer were used, respectively. As a polarizer, a polarizing plate (SIG1423DU (Production No.) manufactured by Nitto Denko Corporation) was used.

(Production of Liquid Crystal Panel)

Figure 4A:
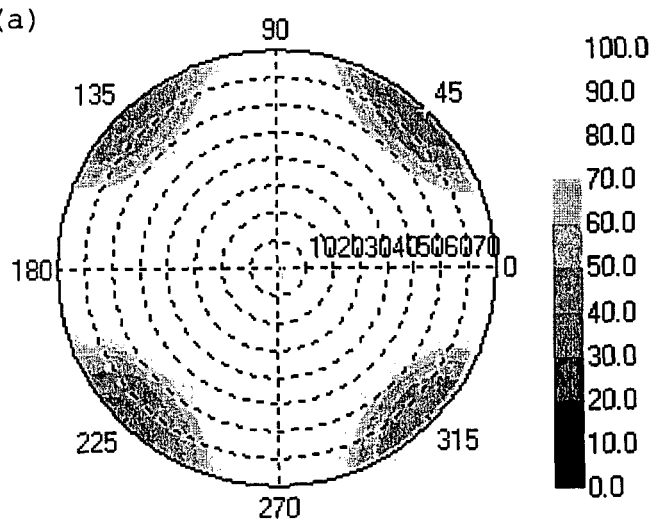
FIG. 4 (a) a contrast contour drawing, (b) an xy chromaticity diagram, and (c) a graph showing a relationship between an x-value and a y-value, and an azimuth angle, each are with respect to a liquid crystal display apparatus obtained in Example 1.
Figure 4B:
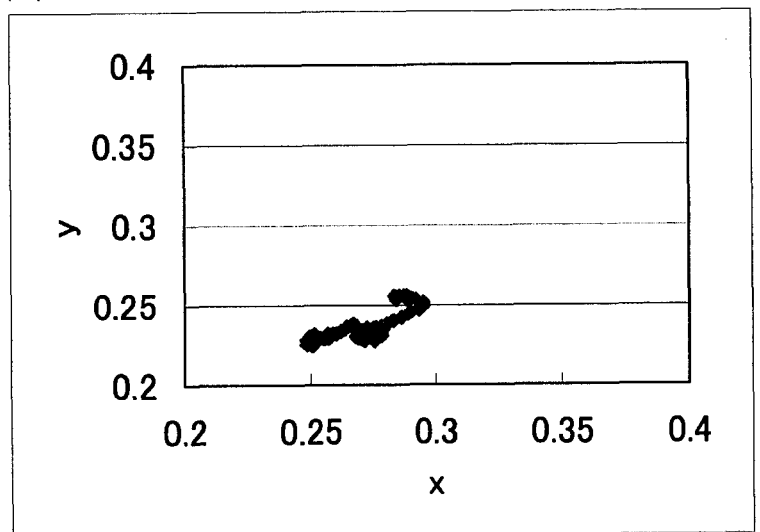
Figure 4C:
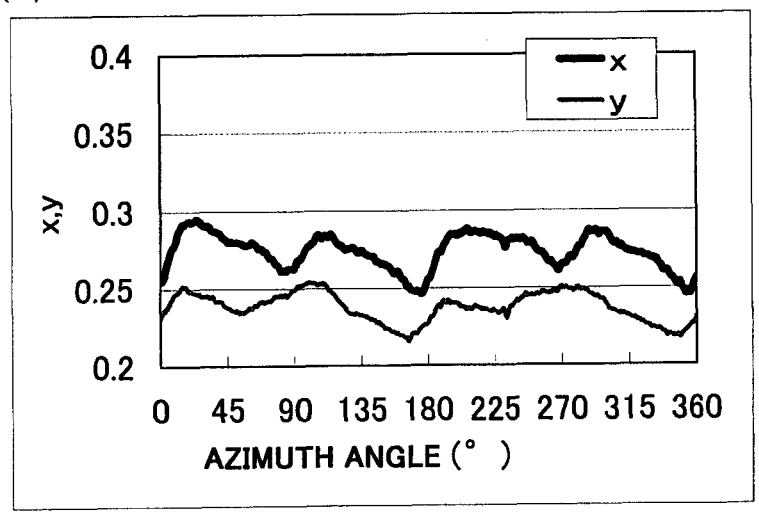

The second optical compensation layer (fourth optical compensation layer) was transferred to the above polarizing plate from the PET film via an acrylic pressure-sensitive adhesive (thickness: 20 μm). Then, the first optical compensation layer (third optical compensation layer) was laminated on the second optical compensation layer (fourth optical compensation layer) via an acrylic pressure-sensitive adhesive (thickness: 20 μm) so that a slow axis of the first optical compensation layer was perpendicular to an absorption axis of a polarizer of the polarizing plate, whereby two polarizing plates with an optical compensation layer were obtained. The two obtained polarizing plates with an optical compensation layer were attached to both sides of a liquid crystal cell of a VA mode taken from a liquid crystal TV (BRAVIA S2000 (32-inch) manufactured by Sony Corporation) so that the absorption axes of the polarizers were perpendicular to each other, whereby a liquid crystal panel was produced. A liquid crystal display apparatus incorporating the obtained liquid crystal panel was allowed to display a white image and a black image, and a contrast and a color shift (a color shift in the case of inclining the polar angle from 0° to 80° in a direction of an azimuth angle of 45° and a color shift in the case of changing the azimuth angle in 0° to 360° at a polar angle of 60°) were measured by EZ Contrast (manufactured by ELDIM). FIG. 4 show the results.

EXAMPLE 2

(Production of First Optical Compensation Layer)

A film ($Re_1$: 36 nm, $Rth_1$: 50 nm, Nz coefficient: 1.4) produced similarly to that of Example 1 was used as a first optical compensation layer.

(Production and Laminating of Second Optical Compensation Layer)

A cyclohexanone solution (15 wt %) of polyimide prepared similarly to that of Example 1 was applied to the first optical compensation layer to a thickness of 20 μm. Then, the resultant solution was dried at 100° C. for 10 minutes, whereby a laminated film in which a second optical compensation layer (polyimide film with a thickness of about 3 μm) was laminated on the first optical compensation layer was obtained. The retardation of the obtained laminated film was measured using a retardation measurement apparatus (KOBRA21ADH manufactured by Oji Scientific Instruments Co., LTD.) to find that Re was 35 nm and Rth was 155 nm.

(Other Optical Elements)

As a third optical compensation layer and a fourth optical compensation layer, the same films as those of the first optical compensation layer and the second optical compensation layer were used, respectively. As a polarizer, the same polarizing plate as that of Example 1 was used.

(Production of Liquid Crystal Panel)

Figure 5A:
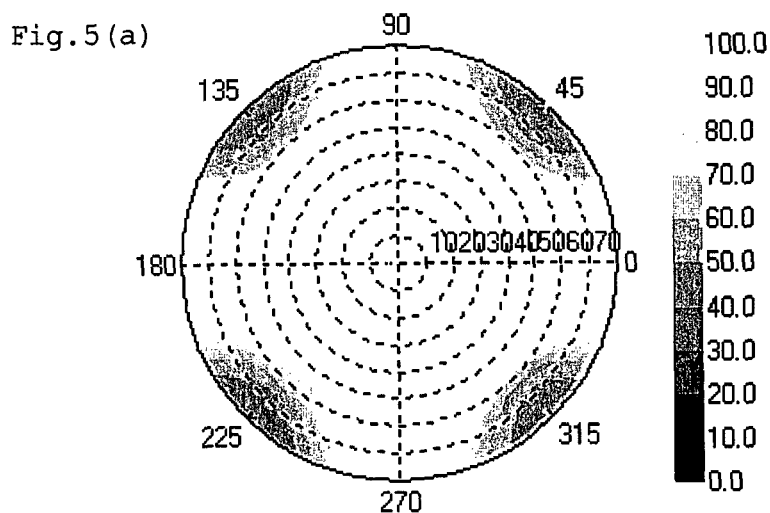
FIG. 5 (a) a contrast contour drawing, (b) an xy chromaticity diagram, and (c) a graph showing a relationship between an x-value and a y-value, and an azimuth angle, each are with respect to a liquid crystal display apparatus obtained in Example 2.
Figure 5B:
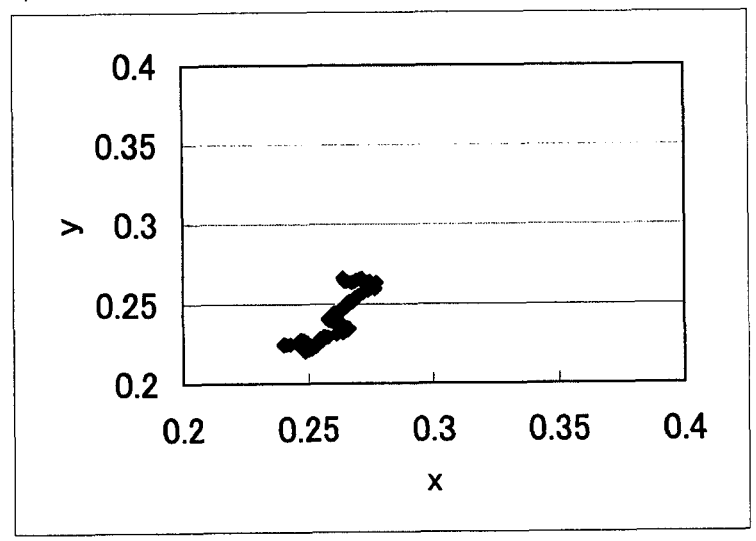
Figure 5C:
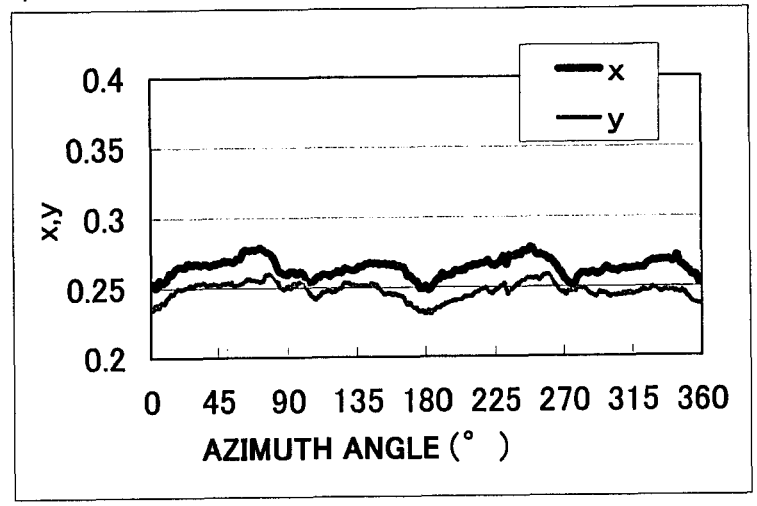

The above laminated film was laminated on a polarizing plate via an acrylic pressure-sensitive adhesive (thickness: 20 μm) so that the second optical compensation layer (fourth optical compensation layer) faced to the polarizing plate and an absorption axis of a polarizer of the polarizing plate and a slow axis of the first optical compensation layer (third optical compensation layer) were perpendicular to each other, whereby two polarizing plates with an optical compensation layer were obtained. A liquid crystal panel was produced using the two obtained polarizing plates with an optical compensation layer, and a contrast and a color shift were measured, in the same way as in Example 1. FIG. 5 show the results.

EXAMPLE 3

Figure 6A:
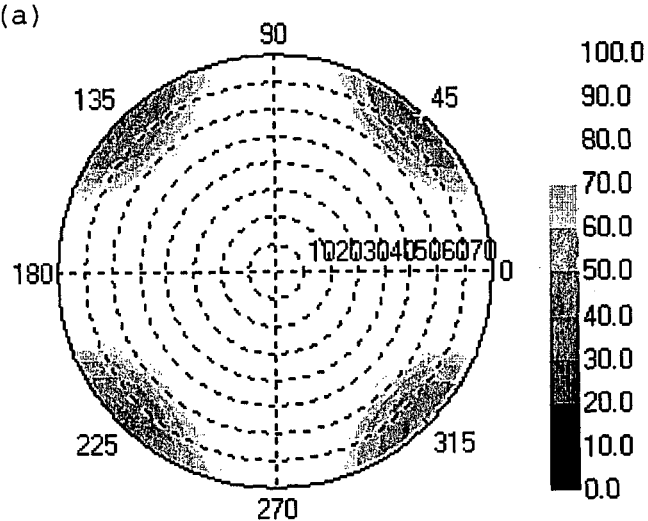
FIG. 6 (a) a contrast contour drawing, (b) an xy chromaticity diagram, and (c) a graph showing a relationship between an x-value and a y-value, and an azimuth angle, each are with respect to a liquid crystal display apparatus obtained in Example 3.
Figure 6B:
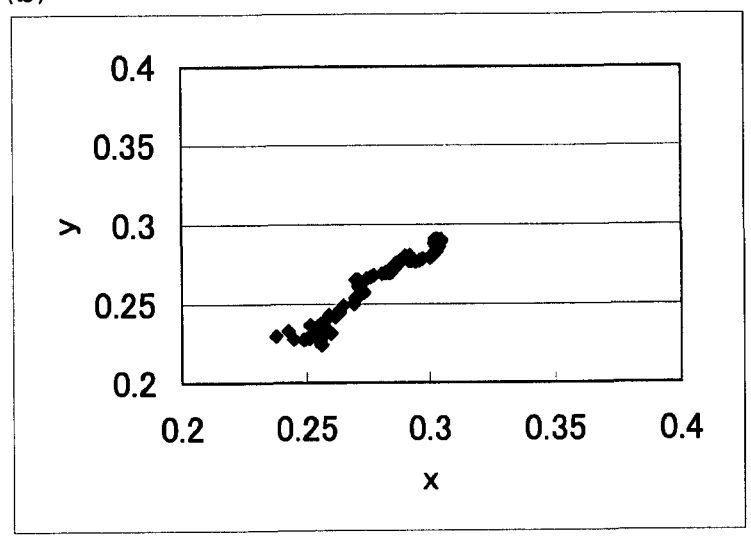
Figure 6C:
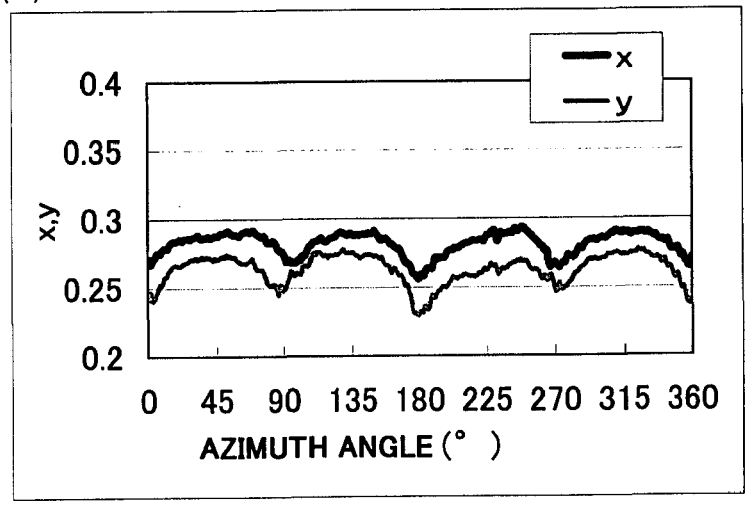

The laminated film produced in Example 2 was laminated in place of a protective layer on one side of a polarizing plate (SEG1224 manufactured by Nitto Denko Corporation) via a PVA-based adhesive (thickness: 0.5 μm) so that the second optical compensation layer (fourth optical compensation layer) and the polarizing plate faced to each other and an absorption axis of a polarizer of the polarizing plate and a slow axis of the first optical compensation layer (third optical compensation layer) were perpendicular to each other. Therefore, two polarizing plates with an optical compensation layer were obtained. A liquid crystal panel was produced using the two obtained polarizing plates with an optical compensation layer, and a contrast and a color shift were measured, in the same way as in Example 1. FIG. 6 show the results.

EXAMPLE 4

(Production of First Optical Compensation Layer)

A film obtained in the same way as in Example 1 except for setting the stretching temperature at 140° C. was used as a first optical compensation layer. The retardation of the obtained film was measured to find that $Re_1$ was 40 nm and $Rth_1$ was 80 nm (Nz coefficient=2).

(Production of Second Optical Compensation Layer)

A polyimide film (thickness: about 2.5 μm) obtained in the same way as in Example 1 except for setting the applying thickness of a cyclohexanone solution (15 wt %) of polyimide to be 16 μm was used as a second optical compensation layer. The retardation of the obtained polyimide film was measured to find that $Re_2$ was 0.3 nm and $Rth_2$ was 80 nm.

(Other Optical Elements)

As a third optical compensation layer and a fourth optical compensation layer, the same films as those of the first optical compensation layer and the second optical compensation layer were used, respectively. As a polarizer, the same polarizing plate as that of Example 1 was used.

(Production of Liquid Crystal Panel)

Figure 7A:
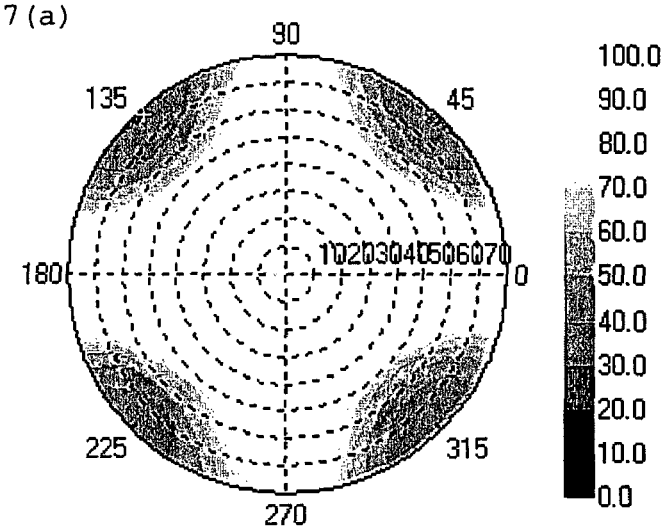
FIG. 7 (a) a contrast contour drawing, (b) an xy chromaticity diagram, and (c) a graph showing a relationship between an x-value and a y-value, and an azimuth angle, each are with respect to a liquid crystal display apparatus obtained in Example 4.
Figure 7B:
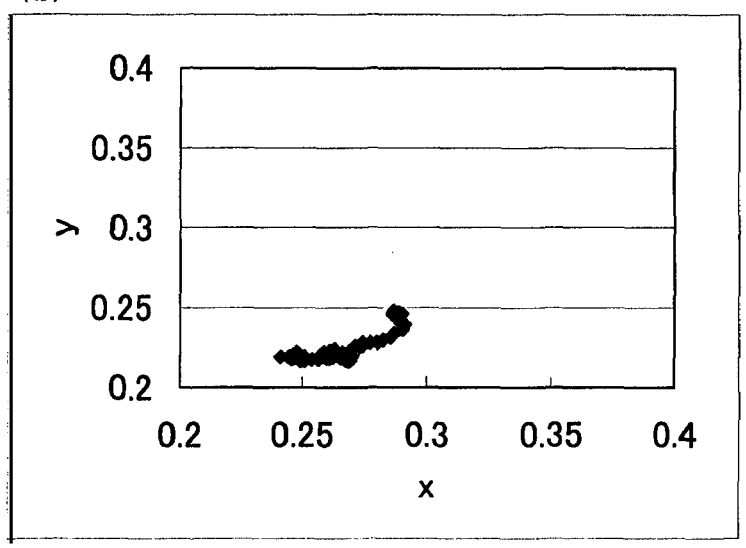
Figure 7C:
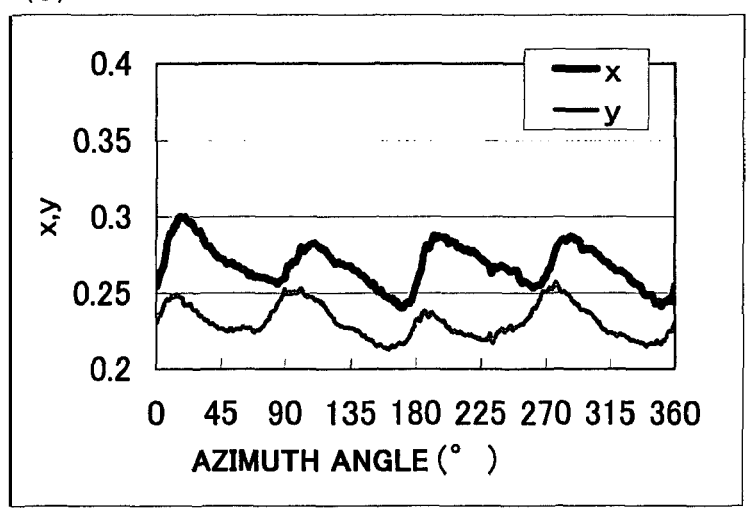

A liquid crystal panel was produced, and a contrast and a color shift were measured, in the same way as in Example 1. FIG. 7 show the results.

EXAMPLE 5

(Production of First Optical Compensation Layer)

A film obtained in the same way as in Example 1 except for setting the stretch ratio to 2.2 times was used as a first optical compensation layer. The retardation of the obtained film was measured to find that $Re_1$ was 40 nm and $Rth_1$ was 60 nm (Nz coefficient=1.5).

(Production of Second Optical Compensation Layer)

A film ($Re_2$: 0.3 nm, $Rth_2$: 80 nm, thickness: about 2.5 μm) produced similarly to that of Example 4 was used as a second optical compensation layer.

(Other Optical Elements)

As a third optical compensation layer and a fourth optical compensation layer, the same films as those of the first optical compensation layer and the second optical compensation layer were used, respectively. As a polarizer, the same polarizing plate as that of Example 1 was used.

(Production of Liquid Crystal Panel)

Figure 8A:
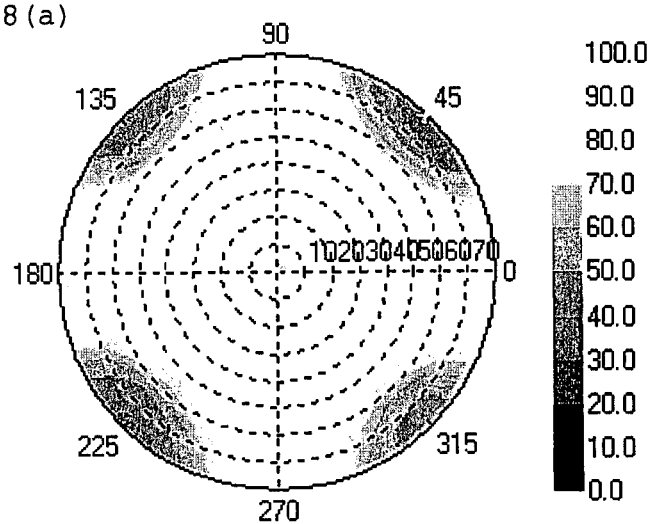
FIG. 8 (a) a contrast contour drawing, (b) an xy chromaticity diagram, and (c) a graph showing a relationship between an x-value and a y-value, and an azimuth angle, each are with respect to a liquid crystal display apparatus obtained in Example 5.
Figure 8B:
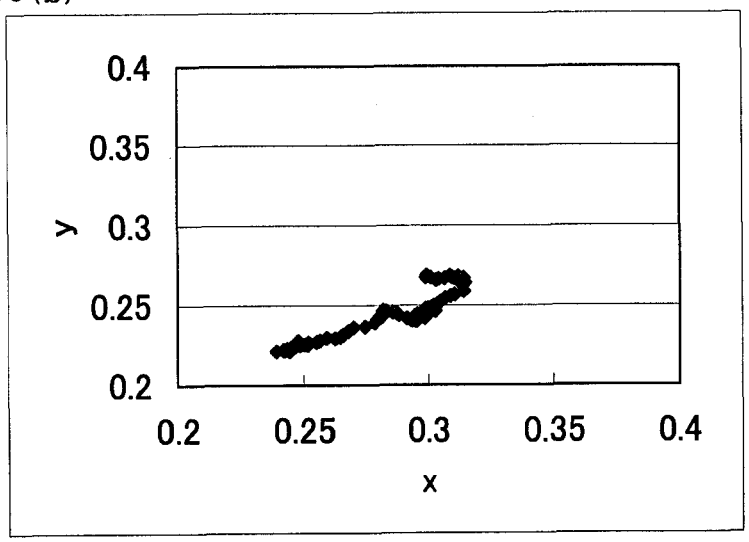
Figure 8C:
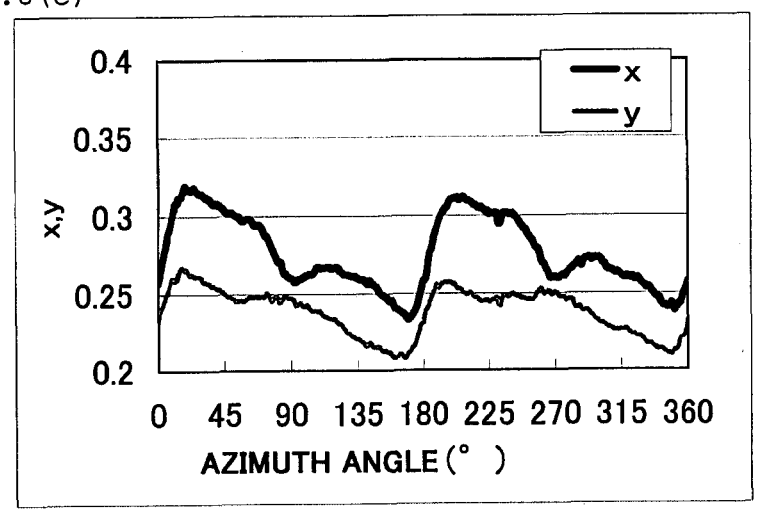

A liquid crystal panel was produced, and a contrast and a color shift were measured, in the same way as in Example 1. FIG. 8 show the results.

EXAMPLE 6

(Production of First Optical Compensation Layer)

Figure 3B:
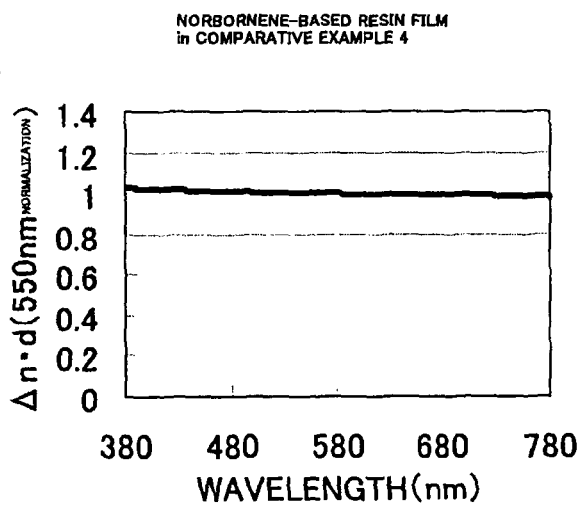
Figure 3C:
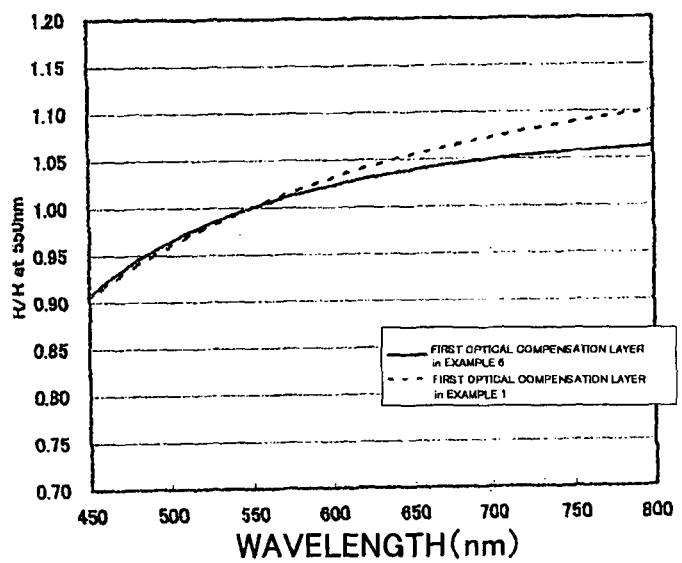

As a polyester-based material, was used a polyester resin synthesized from 1,4-cyclohexanedicarboxylic acid (trans: cis=95:5) as a dicarboxylic acid component, and 80 mol % of 9,9-bis[4-(2-hydroxyethoxy)phenyl]fluorine and 20 mol % of 1,4-cyclohexanedimethanol as a diol component assumed to be 100 mol %. The polyester resin had an intrinsic viscosity of 0.462 dl/g and glass transition temperature of 130.1° C. A film (thickness: 150 μm) formed of the polyester resin was subjected to a fixed-end transverse stretching by 2 times at 135° C. to obtain a film as a first optical compensation layer. The retardation of the obtained film was measured to find that $Re_1$ was 130 nm and $Rth_1$ was 140 nm (Nz coefficient=1.1). FIG. 3(c) shows a refractive index wavelength dispersion of the obtained film and a refractive index wavelength dispersion of the first optical compensation layer used in Example 1.

(Production of Second Optical Compensation Layer)

A film ($Re_2$: 0.2 nm, $Rth_2$: 100 nm, thickness: about 3 μm) produced similarly to that of Example 1 was used as a second optical compensation layer.

(Other Optical Elements)

As a third optical compensation layer and a fourth optical compensation layer, the same films as those of the first optical compensation layer and the second optical compensation layer were used, respectively. As a polarizer, the same polarizing plate as that of Example 1 was used.

(Production of Liquid Crystal Panel)

A liquid crystal panel was produced in the same way as in Example 1. When a contrast and a color shift of the liquid crystal panel are measured, similar contrast and color shift to those shown in FIG. 4 are obtained.

EXAMPLE 7

(Production of First Optical Compensation Layer)

A film ($Re_1$: 130 nm, $Rth_1$: 140 nm, Nz coefficient=1.1) produced similarly to that of Example 6 was used as a first optical compensation layer.

(Production of Second Optical Compensation Layer)

A film ($Re_2$: 0.3 nm, $Rth_2$: 80 nm, thickness: about 2.5 μm) produced similarly to that of Example 4 was used as a second optical compensation layer.

(Other Optical Elements)

As a third optical compensation layer and a fourth optical compensation layer, the same films as those of the first optical compensation layer and the second optical compensation layer were used, respectively. As a polarizer, the same polarizing plate as that of Example 1 was used.

(Production of Liquid Crystal Panel)

A liquid crystal panel was produced in the same way as in Example 1. When a contrast and a color shift of the liquid crystal panel are measured, similar contrast and color shift to those shown in FIG. 7 are obtained.

COMPARATIVE EXAMPLE 1

Figure 9A:
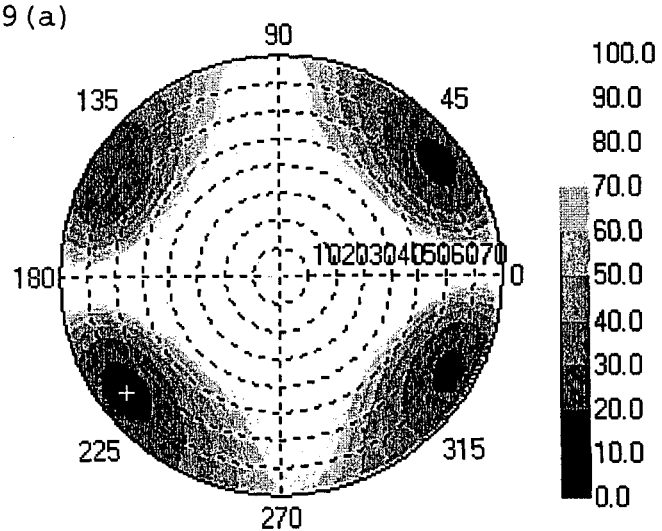
FIG. 9 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 1.
Figure 9B:
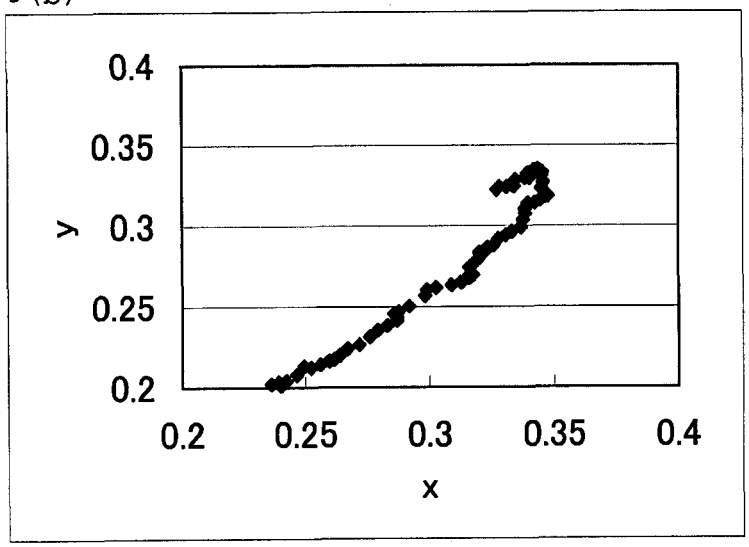
Figure 9C:
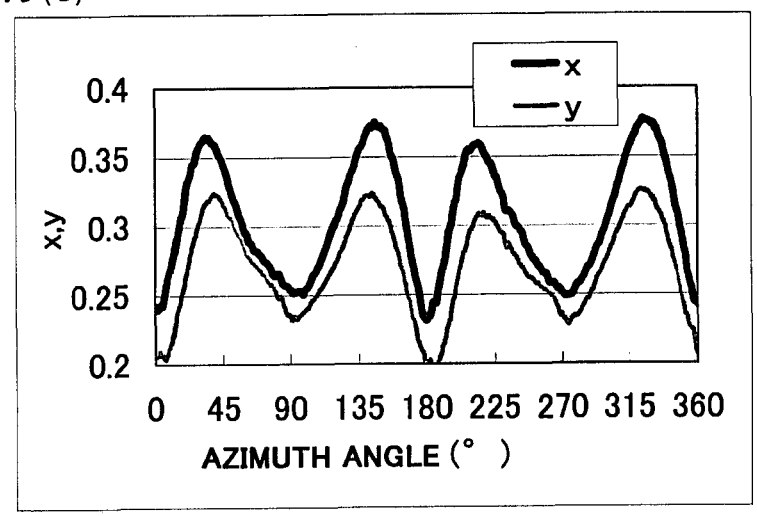

Polarizing plates with an optical compensation layer for a liquid crystal cell of a VA mode (NIBCOM (NXP) (trade name) manufactured by Nitto Denko Corporation, with a Nz coefficient of an optical compensation layer of 4.8) were attached to both sides of the same liquid crystal cell as that of Example 1 so that absorption axes of polarizers of polarizing plates were perpendicular to each other, whereby a liquid crystal panel was produced. Then, a contrast and a color shift were measured in the same way as in Example 1. FIG. 9 show the results.

COMPARATIVE EXAMPLE 2

Figure 10A:
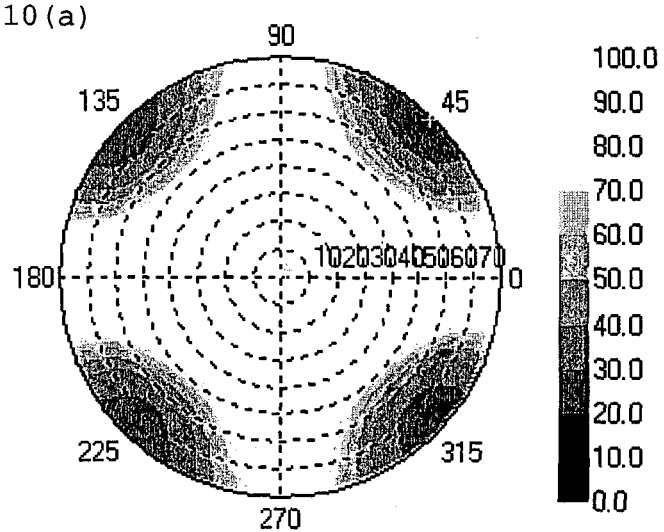
FIG. 10 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 2.
Figure 10B:
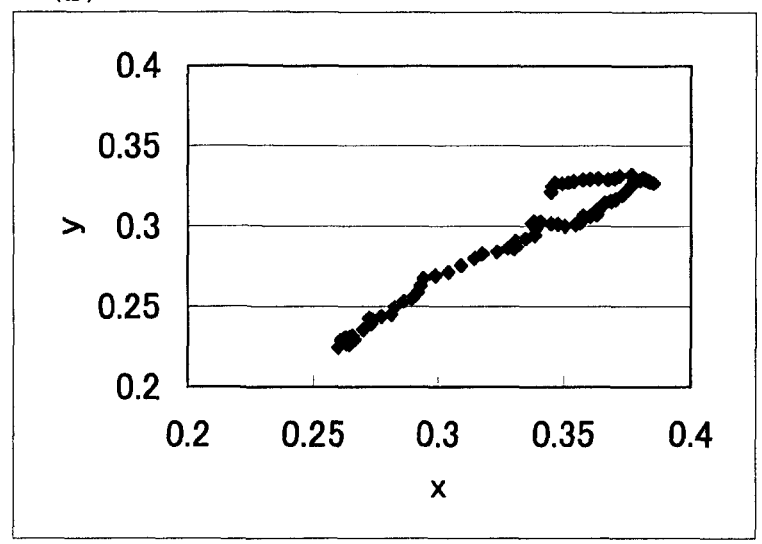
Figure 10C:
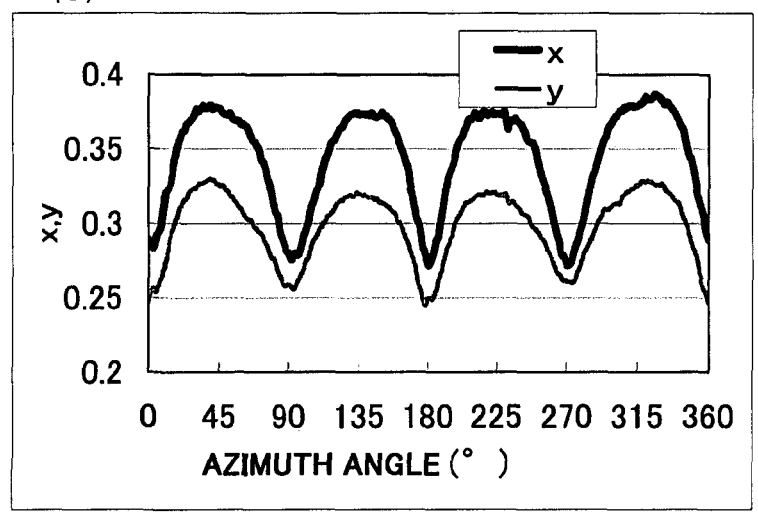

A norbornene-based resin film (ZEONOR manufactured by ZEON Corporation) was subjected to sequential biaxial stretching by 1.25 times in a transverse axis direction and by 1.03 times in a longitudinal axis direction at 135° C., whereby a retardation film (thickness: 80 μm) with Re of 78 nm and Rth of 170 nm was obtained (Nz coefficient=2.2). The film was laminated on a polarizing plate (SEG1224 manufactured by Nitto Denko Corporation) via an acrylic pressure-sensitive adhesive (thickness: 20 μm) so that a slow axis of the film was perpendicular to an absorption axis of a polarizer of a polarizing plate, whereby a polarizing plate with an optical compensation layer was obtained. The obtained polarizing plate with an optical compensation layer and a polarizing plate (SEG1224 manufactured by Nitto Denko Corporation) were attached to both sides of the same liquid crystal cell as that of Example 1 so that absorption axes of the polarizers were perpendicular to each other, whereby a liquid crystal panel was produced. At this time, the polarizing plate with an optical compensation layer was attached to a backlight side. Then, in the same way as in Example 1, a contrast and a color shift were measured. FIG. 10 show the results.

COMPARATIVE EXAMPLE 3

Figure 11A:
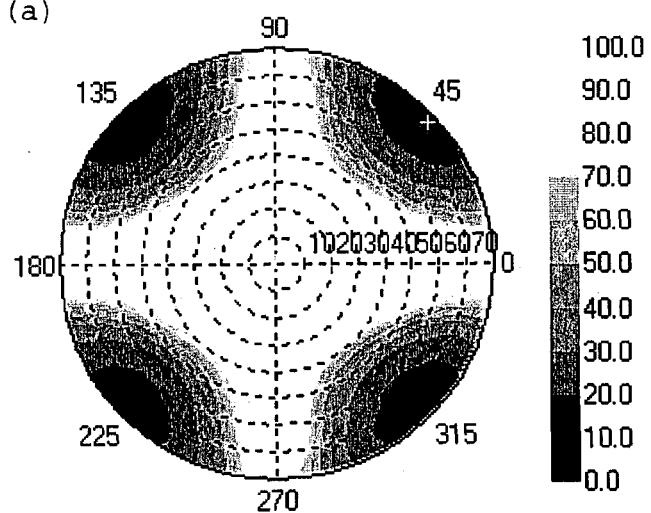
FIG. 11 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 3.
Figure 11B:
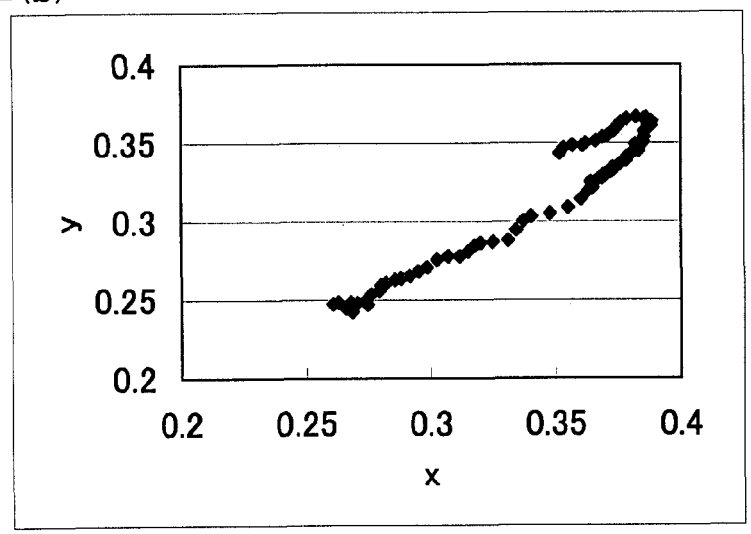
Figure 11C:
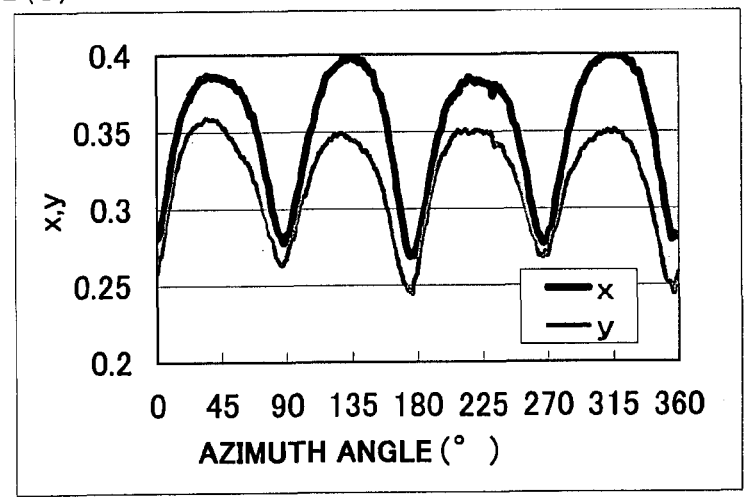

A retardation film NTAC (Re: 45 nm, Rth: 145 nm, thickness: 80 μm, Nz coefficient: 3.2) manufactured by Konica Minolta Co., Ltd. was laminated on a polarizing plate (SEG1224 manufactured by Nitto Denko Corporation) via an acrylic pressure-sensitive adhesive (thickness: 20 μm) so that a slow axis of the retardation film NTAC was perpendicular to an absorption axis of a polarizer of the polarizing plate, whereby two polarizing plates with an optical compensation layer were obtained. The two obtained polarizing plates with an optical compensation layer were attached to both sides of the same liquid crystal cell as that of Example 1 so that absorption axes of polarizers were perpendicular to each other, whereby a liquid crystal panel was produced. Then, a contrast and a color shift were measured in the same way as in Example 1. FIG. 11 show the results.

COMPARATIVE EXAMPLE 4

A norbornene-based resin film (ZEONOR manufactured by ZEON Corporation) was subjected to fixed-end transverse stretching by 1.5 times at 160° C., whereby a retardation film (thickness: 60 μm) with Re of 42 nm and Rth of 55 nm was obtained (Nz coefficient=1.3). The refractive index wavelength dispersion of the norbornene-based resin film was so-called flat wavelength dispersion as shown in FIG. 3(B).

Figure 12A:
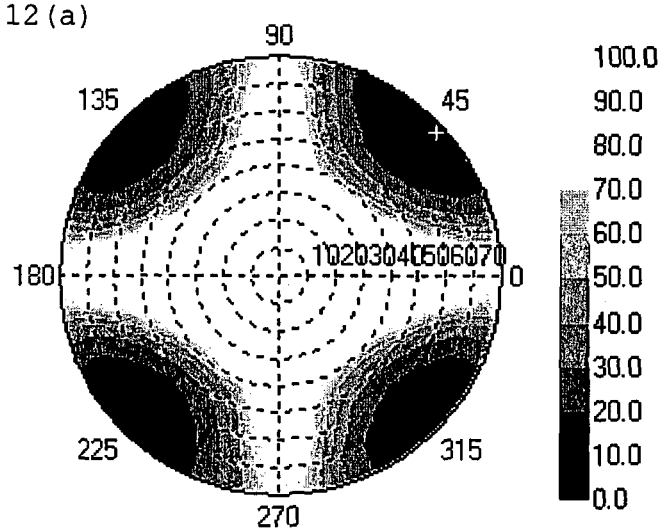
FIG. 12 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 4.
Figure 12B:
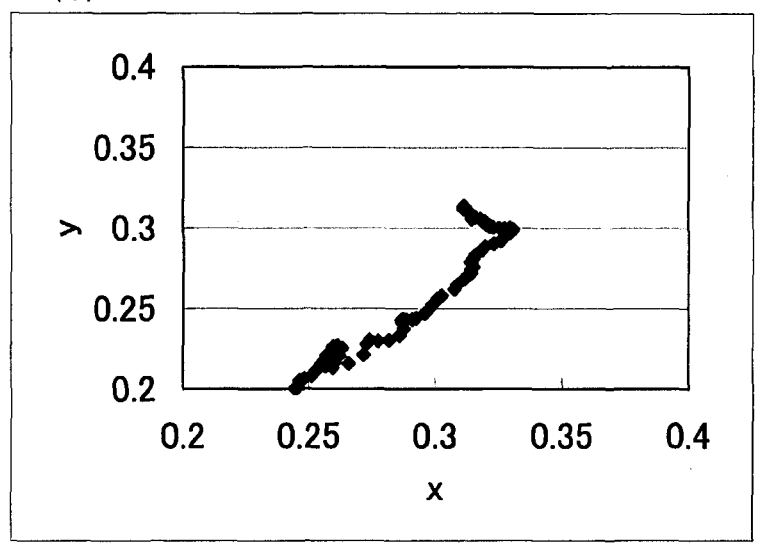
Figure 12C:
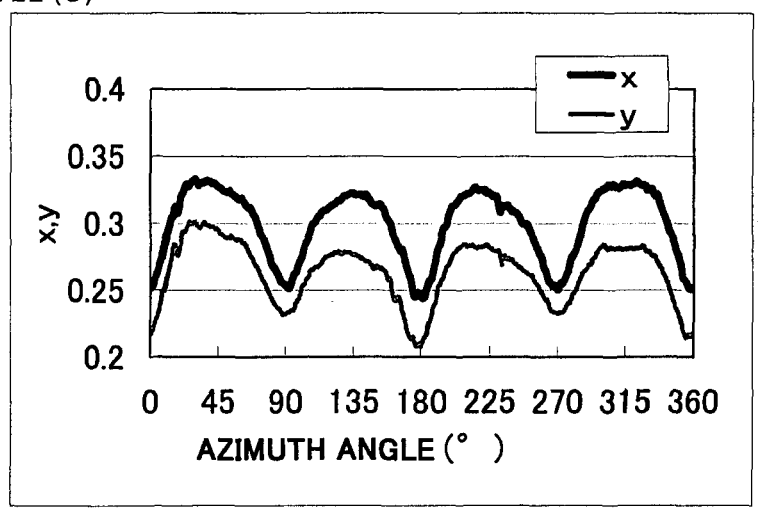

A polyimide film (Re: 0.3 nm, Rth: 80 nm, thickness: about 2.5 μm) produced in the same way as in the second optical compensation layer of Example 4 was laminated on a polarizing plate (SIG1423DU (Production No.) manufactured by Nitto Denko Corporation) via an acrylic pressure-sensitive adhesive (thickness: 20 μm). Then, the above retardation film made of the norbornene-based resin was laminated on the above polyimide film via an acrylic pressure-sensitive adhesive (thickness: 20 μm) so that a slow axis of the retardation film was perpendicular to an absorption axis of a polarizer of the polarizing plate, whereby two polarizing plates with an optical compensation layer were obtained. The two obtained polarizing plates with an optical compensation layer were attached to both sides of the same liquid crystal cell as that of Example 1 so that the retardation film made of the norbornene-based resin faced to the liquid crystal cell and absorption axes of the polarizers were perpendicular to each other, whereby a liquid crystal panel was produced. Then, a contrast and a color shift were measured in the same way as in Example 1 (measurement was performed in a portion without light leakage because a lot of unevenness was observed on a screen). FIG. 12 show the results.

COMPARATIVE EXAMPLE 5

In the same way as in the method of producing a second optical compensation layer in Example 1, except for using a Z-TAC film (thickness: 80 μm, manufactured by Fujifilm Corporation) substantially having optical isotropy in place of the PET film and setting the applying thickness of the cyclohexanone solution (15 wt %) of polyimide to be 16 μm, a film in which a polyimide film (thickness: about 2.5 μm) was laminated on the Z-TAC film was obtained. The retardation of the obtained laminated film was measured to find that Re was 1 nm and Rth was 100 nm.

Next, a polyimide film was obtained in the same way as in the method of producing a second optical compensation layer in Example 1, except for using a norbornene-based resin film (ZEONOR manufactured by ZEON Corporation) in placed of the PET film and setting the applying thickness of the cyclohexanone solution (15 wt %) of polyimide to be 8 μm. Then, the obtained polyimide film was subjected to free-end stretching by 2.5 times at 160° C., whereby a stretched polyimide film (thickness: about 1 μm) was obtained. The obtained stretched polyimide film was transferred to a glass plate, and the retardation thereof was measured to find that Re was 40 nm and Rth was 48 nm (Nz coefficient=1.2).

Figure 13A:
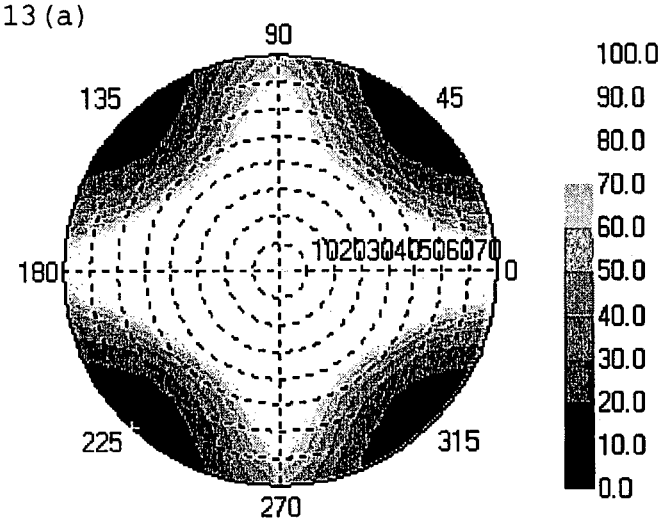
FIG. 13 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 5.
Figure 13B:
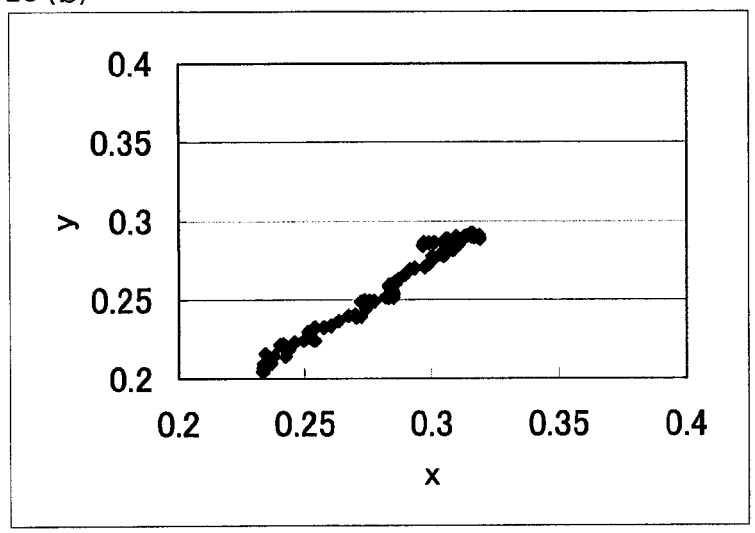
Figure 13C:
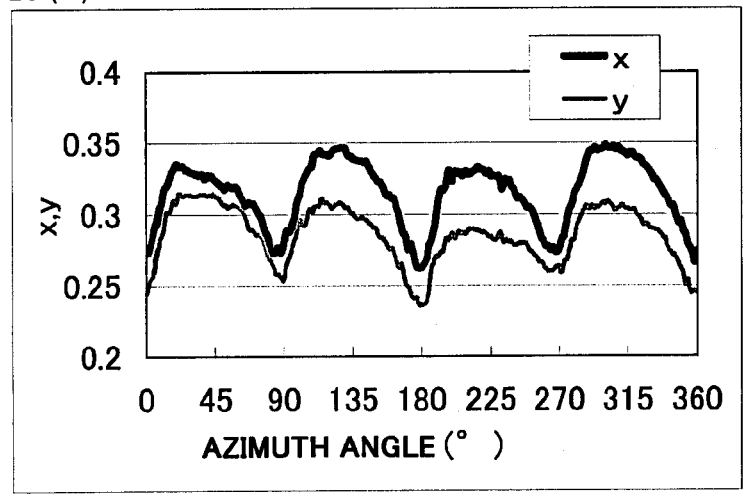

The above stretched polyimide film (Re: 40 nm, Rth: 48 nm, Nz coefficient: 1.2) was transferred from a norbornene-based resin film to a polyimide film layer of the above laminated film (Re: 1 nm, Rth: 100 nm) via an acrylic pressure-sensitive adhesive (thickness: 20 μm). The obtained laminated film was laminated on a polarizing plate (SIG1423DU (Production No.) manufactured by Nitto Denko Corporation) via an acrylic pressure-sensitive adhesive (thickness: 20 μm) so that a Z-TAC film layer faced to the polarizing plate and a slow axis of the stretched polyimide film was perpendicular to an absorption axis of a polarizer of the polarizing plate, whereby two polarizing plates with an optical compensation layer were obtained. Then, the two obtained polarizing plates with an optical compensation layer were attached to both sides of the same liquid crystal cell as that of Example 1 so that absorption axes of polarizers were perpendicular to each other, whereby a liquid crystal panel was produced. Then, a contrast and a color shift were measured in the same way as in Example 1. FIG. 13 show the results.

COMPARATIVE EXAMPLE 6

Figure 14A:
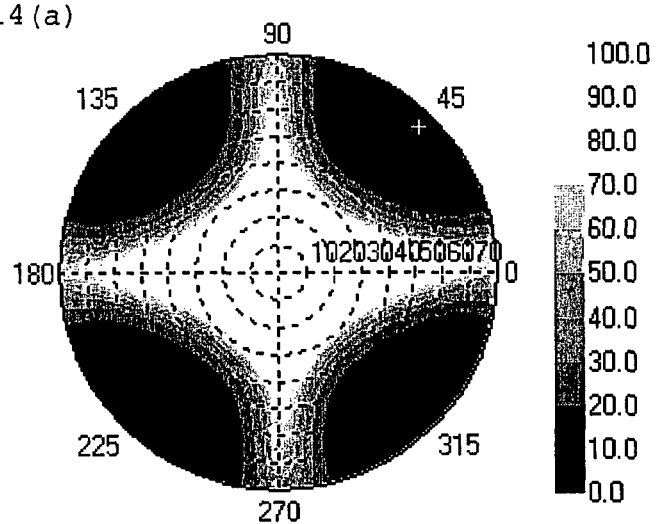
FIG. 14 (a) a contrast contour drawing, (b) an xy chromaticity diagram, and (c) a graph showing a relationship between an x-value and a y-value, and an azimuth angle, each are with respect to a liquid crystal display apparatus obtained in Comparative Example 6.
Figure 14B:
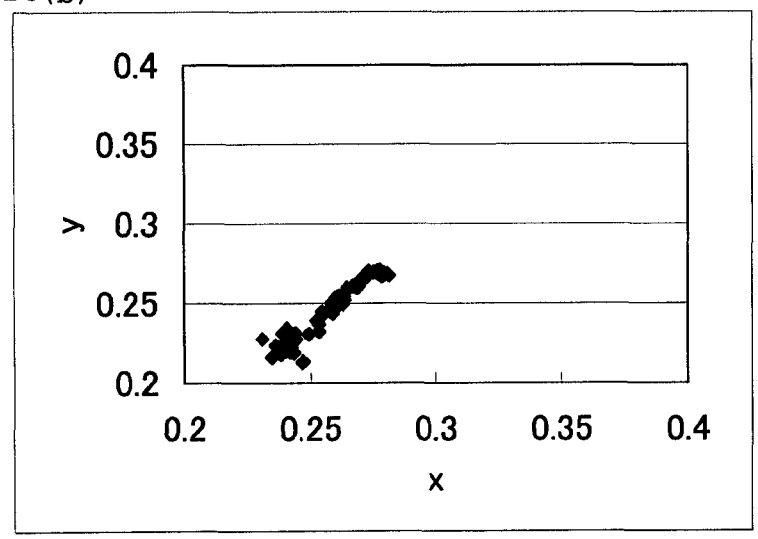
Figure 14C:
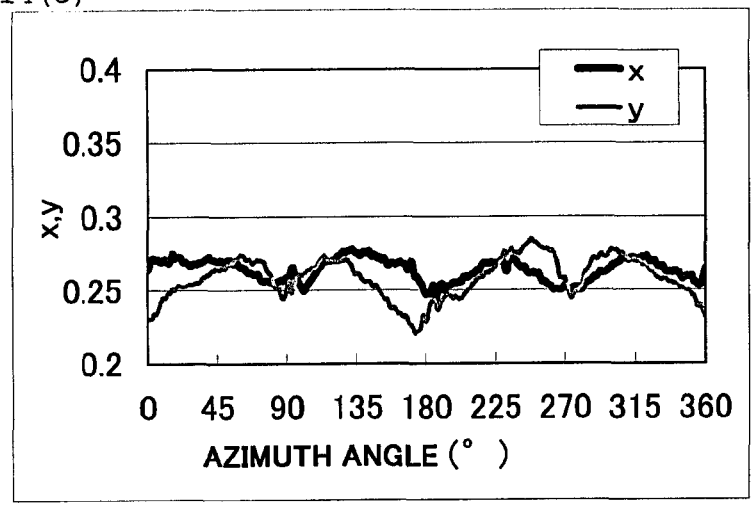

A film (ARTON1 manufactured by JSR Corporation) having a positive refractive index wavelength dispersion (positive dispersion) was subjected to sequential biaxial stretching by 1.3 times in transverse and longitudinal directions at 175° C., whereby a retardation film (refractive index profile: nx=ny>nz, Re: 2 nm, Rth: 220 nm, thickness: 80 μm) was obtained. The obtained retardation film was laminated on a polarizing plate (SEG1224 manufactured by Nitto Denko Corporation) via an acrylic pressure-sensitive adhesive (thickness: 20 μm), whereby a polarizing plate with an optical compensation layer 1 was obtained. Further, a polycarbonate-based resin film (PUREACE manufactured by Teijin Chemicals Ltd., Re: 145 nm, Rth: 141 nm, thickness: 77 μm, Nz coefficient: 1.0) having a negative refractive index wavelength dispersion (reverse dispersion) was laminated on a polarizing plate via an acrylic pressure-sensitive adhesive (thickness: 20 μm) so that a slow axis of the polycarbonate-based resin film and an absorption axis of a polarizer of the polarizing plate were perpendicular to each other, whereby a polarizing plate with an optical compensation layer 2 was obtained. Then, the polarizing plates with an optical compensation layer 1 and 2 were attached to both sides of the same liquid crystal cell as that of Example 1 so that absorption axes of the polarizers were perpendicular to each other, whereby a liquid crystal panel was produced. Herein, the polarizing plate with an optical compensation layer 1 was attached to a backlight side. Then, a contrast and a color shift were measured in the same way as in Example 1. FIG. 14 show the results.

COMPARATIVE EXAMPLE 7

A retardation film 1 (Re: 0.2 nm, Rth: 100 nm) produced in the same way as in the second optical compensation layer in Example 1 was transferred from the PET film to a polarizing plate (SIG1423DU (Production No.) manufactured by Nitto Denko Corporation) via an acrylic pressure-sensitive adhesive (thickness: 20 μm). Then, a retardation film 2 (Re: 36 nm, Rth: 50 nm, Nz coefficient: 1.4) produced in the same way as in the first optical compensation layer of Example 1 was laminated on the retardation film 1 via an acrylic pressure-sensitive adhesive (thickness: 20 μm) so that a slow axis of the retardation film 2 was perpendicular to an absorption axis of a polarizer of the polarizing plate, whereby a polarizing plate with an optical compensation layer 3 was obtained.

The above retardation film 2 was laminated on a polarizing plate (SIG1423DU (Production No.) manufactured by Nitto Denko Corporation) via an acrylic pressure-sensitive adhesive (thickness: 20 μm) so that a slow axis of the retardation film 2 was perpendicular to an absorption axis of a polarizer of the polarizing plate. Then, the retardation film 1 was laminated (transferred) onto the retardation film 2 via an acrylic pressure-sensitive adhesive (thickness: 20 μm), whereby a polarizing plate with an optical compensation layer 4 was obtained.

Figure 15A:
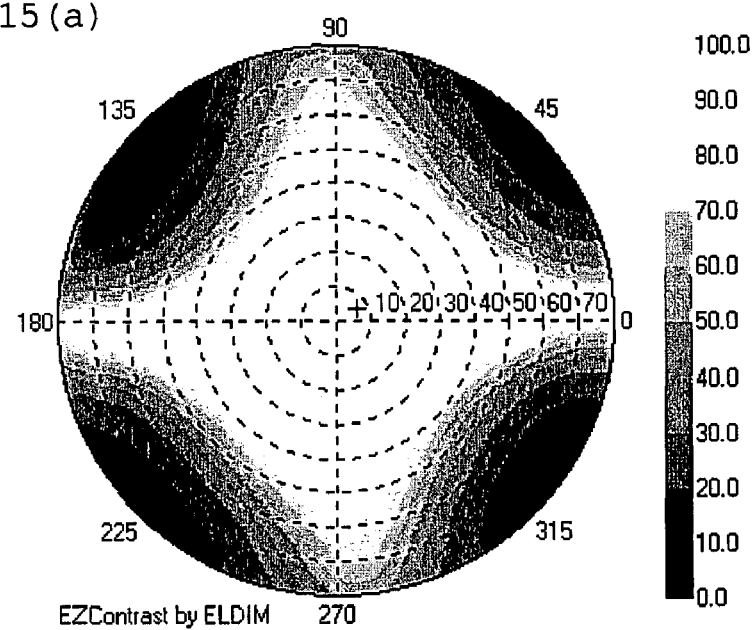
FIG. 15 (a) a contrast contour drawing, and (b) a graph showing a relationship between an x-value and a y-value, and an azimuth angle, both are with respect to a liquid crystal display apparatus obtained in Comparative Example 7.
Figure 15B:
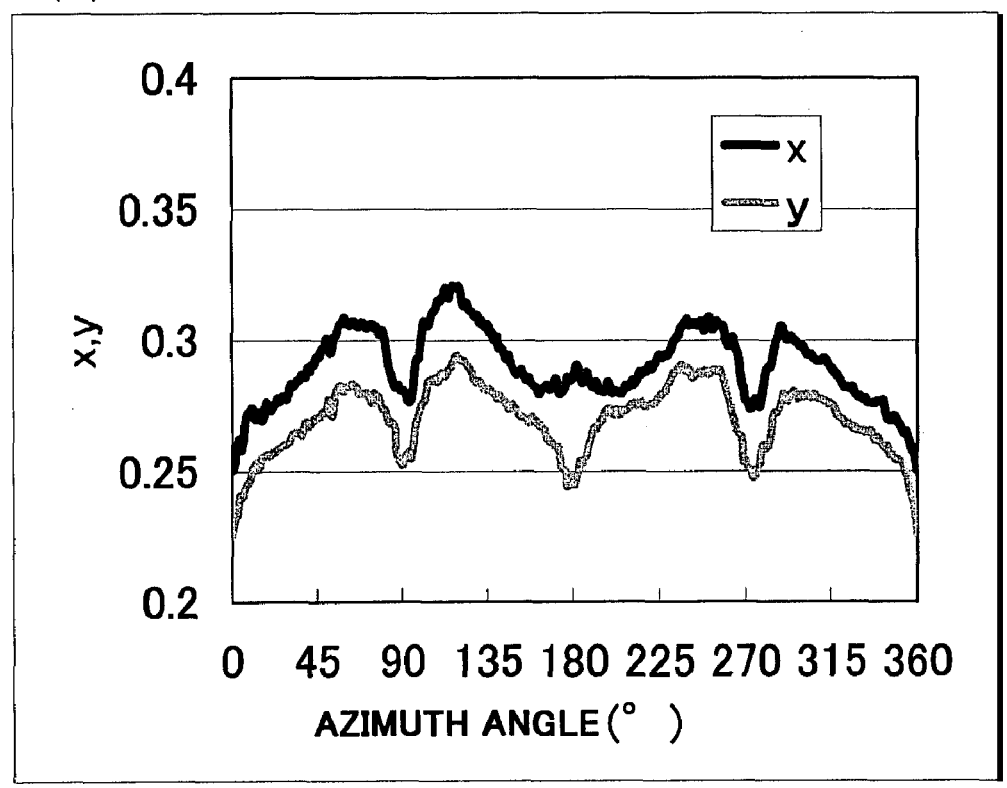

The obtained polarizing plates with an optical compensation layer 3 and 4 were attached to both sides of the same liquid crystal cell as that of Example 1 so that absorption axes of polarizers were perpendicular to each other, whereby a liquid crystal panel was produced. Herein, the polarizing plate with an optical compensation layer 4 was attached to a backlight side. Then, a contrast and a color shift were measured in the same way as in Example 1. FIG. 15 show the results.

COMPARATIVE EXAMPLE 8

Figure 16A:
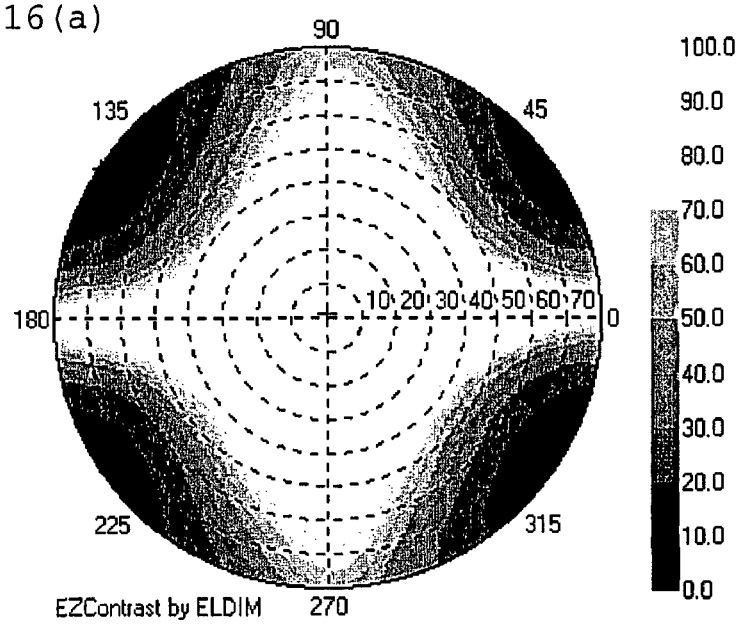
FIG. 16 (a) a contrast contour drawing, and (b) a graph showing a relationship between an x-value and a y-value, and an azimuth angle, both are with respect to a liquid crystal display apparatus obtained in Comparative Example 8.
Figure 16B:
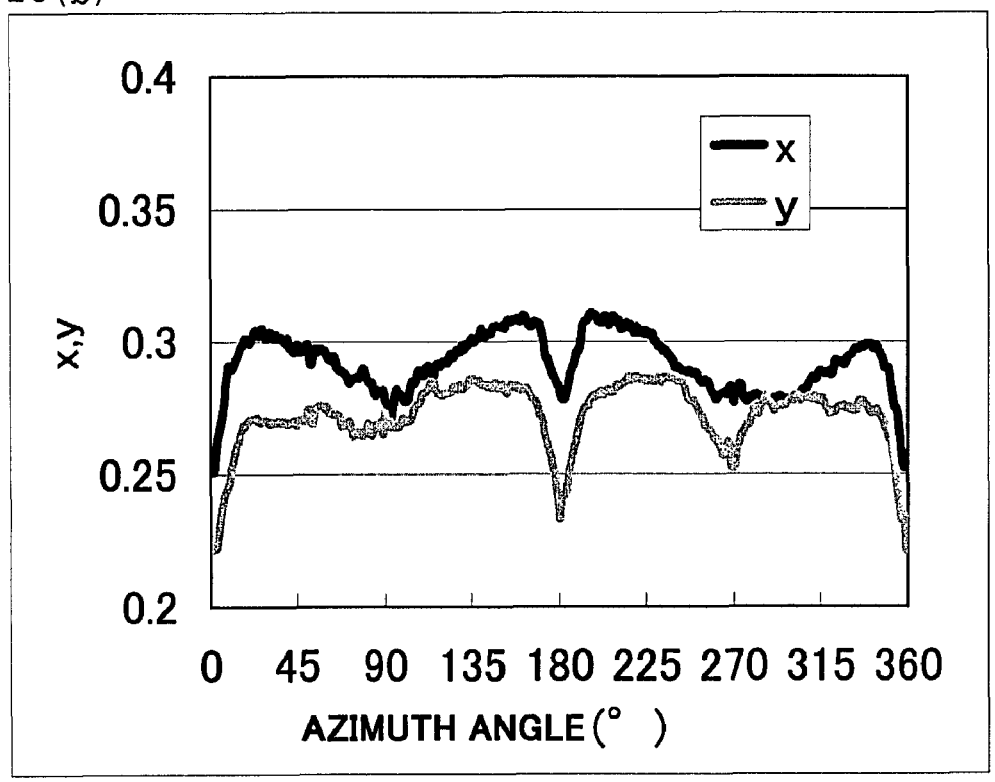

A contrast and a color shift were measured in the same way as in Comparative Example 7, except for attaching the polarizing plate with an optical compensation layer 3 to a backlight side, and attaching the polarizing plate with an optical compensation layer 4 to a viewer side. FIG. 16 show the results.

Tables 1 and 2 show the outline of the configuration of the liquid crystal panels produced in the above Examples 1 to 7 and Comparative Examples 1 to 8.

TABLE 1

| | | | Example | | | |
|---|---|---|---|---|---|---|
| 1 | 2 | 3 | 4 | 5 | 6 | 7 |
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |
| FIRST POLARIZER | FIRST POLARIZER | FIRST POLARIZER | FIRST POLARIZER | FIRST POLARIZER | FIRST POLARIZER | FIRST POLARIZER |
| PROTECTIVE LAYER | PROTECTIVE LAYER | | PROTECTIVE LAYER | PROTECTIVE LAYER | PROTECTIVE LAYER | PROTECTIVE LAYER |
| NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) |
| PLATE Nz = 1.4 (REVERSE DISPERSION) | PLATE Nz = 1.4 (REVERSE DISPERSION) | PLATE Nz = 1.4 (REVERSE DISPERSION) | PLATE Nz = 2 (REVERSE DISPERSION) | PLATE Nz = 1.5 (REVERSE DISPERSION) | PLATE Nz = 1.1 (REVERSE DISPERSION) | PLATE Nz = 1.1 (REVERSE DISPERSION) |
| LIQUID CRYSTAL CELL | LIQUID CRYSTAL CELL | LIQUID CRYSTAL CELL | LIQUID CRYSTAL CELL | LIQUID CRYSTAL CELL | LIQUID CRYSTAL CELL | LIQUID CRYSTAL CELL |
| PLATE Nz = 1.4 (REVERSE DISPERSION) | PLATE Nz = 1.4 (REVERSE DISPERSION) | PLATE Nz = 1.4 (REVERSE DISPERSION) | PLATE Nz = 2 (REVERSE DISPERSION) | PLATE Nz = 1.5 (REVERSE DISPERSION) | PLATE Nz = 1.1 (REVERSE DISPERSION) | PLATE Nz = 1.1 (REVERSE DISPERSION) |
| NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) | NEGATIVE C PLATE (nx = ny > nz) (POSITIVE DISPERSION) |
| PROTECTIVE LAYER | PROTECTIVE LAYER | | PROTECTIVE LAYER | PROTECTIVE LAYER | PROTECTIVE LAYER | PROTECTIVE LAYER |
| SECOND POLARIZER | SECOND POLARIZER | SECOND POLARIZER | SECOND POLARIZER | SECOND POLARIZER | SECOND POLARIZER | SECOND POLARIZER |
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |

BACKLIGHT SIDE

TABLE 2

COMPARATIVE EXAMPLE

| 1 | 2 | 3 | 4 | 5 | 6 | 7 | 8 |
|---|---|---|---|---|---|---|---|
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |
| FIRST POLARIZER | FIRST POLARIZER | FIRST POLARIZER | FIRST POLARIZER | FIRST POLARIZER | FIRST POLARIZER | FIRST POLARIZER | FIRST POLARIZER |
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |
| PLATE $Nz = 4.8$ (POSITIVE DISPERSION) |   | PLATE $Nz = 3.2$ (REVERSE DISPERSION) | NEGATIVE C PLATE ($nx = ny > nz$) (POSITIVE DISPERSION) PLATE $Nz = 1.3$ (FLAT DISPERSION) | NEGATIVE C PLATE ($nx = ny > nz$) (POSITIVE DISPERSION) PLATE $Nz = 1.2$ (POSITIVE DISPERSION) | PLATE $Nz = 1.0$ (REVERSE DISPERSION) | NEGATIVE C PLATE ($nx = ny > nz$) (POSITIVE DISPERSION) PLATE $Nz = 1.4$ (REVERSE DISPERSION) | PLATE $Nz = 1.4$ (REVERSE DISPERSION) NEGATIVE C PLATE ($nx = ny > nz$) (POSITIVE DISPERSION) |
| LIQUID CRYSTAL CELL | LIQUID CRYSTAL CELL | LIQUID CRYSTAL CELL | LIQUID CRYSTAL CELL | LIQUID CRYSTAL CELL | LIQUID CRYSTAL CELL | LIQUID CRYSTAL CELL | LIQUID CRYSTAL CELL |
| PLATE $Nz = 4.8$ (POSITIVE DISPERSION) | PLATE $Nz = 2.2$ (FLAT DISPERSION) | PLATE $Nz = 3.2$ (REVERSE DISPERSION) | PLATE $Nz = 1.3$ (FLAT DISPERSION) NEGATIVE C PLATE ($nx = ny > nz$) (POSITIVE DISPERSION) | PLATE $Nz = 1.2$ (POSITIVE DISPERSION) NEGATIVE C PLATE ($nx = ny > nz$) (POSITIVE DISPERSION) | NEGATIVE C PLATE ($nx = ny > nz$) (POSITIVE DISPERSION) | NEGATIVE C PLATE ($nx = ny > nz$) (POSITIVE DISPERSION) PLATE $Nz = 1.4$ (REVERSE DISPERSION) | PLATE $Nz = 1.4$ (REVERSE DISPERSION) NEGATIVE C PLATE ($nx = ny > nz$) (POSITIVE DISPERSION) |
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |
| SECOND POLARIZER | SECOND POLARIZER | SECOND POLARIZER | SECOND POLARIZER | SECOND POLARIZER | SECOND POLARIZER | SECOND POLARIZER | SECOND POLARIZER |
| PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER | PROTECTIVE LAYER |

BACKLIGHT SIDE

As shown in the contrast contour drawings in FIGS. 4 to 16, in the liquid crystal panels of Examples 1 to 5, viewing angle characteristics of a contrast are enhanced remarkably, compared with those of the liquid crystal panels of Comparative Examples 1 to 8. Further, points on the chromaticity diagrams show that a color shift is smaller as a movement distance thereof is smaller. Thus, as shown in the xy chromaticity diagrams of FIGS. 4 to 14, it can be confirmed that, in the liquid crystal panels of Examples 1 to 5, a color shift in the case of inclining the polar angle from 0° to 80° in a direction of an azimuth angle of 45° is also suppressed remarkably, compared with that of the liquid crystal panels of Comparative Examples 1 to 6. Further, a graph showing a relationship between an x-value and a y-value, and an azimuth angle shows that a color shift is smaller as an amplitude of (x, y) is smaller. Thus, as shown in the graphs illustrating a relationship between an x-value and a y-value, and an azimuth angle in FIGS. 4 to 16, it is understood that, in the liquid crystal panels in Examples 1 to 5, a color shift in the case of changing the azimuth angle in 0° to 360° at a polar angle of 60° is suppressed remarkably compared with that of the liquid crystal panels in Comparative Examples 1 to 8. In the liquid crystal panel in Comparative Example 6, although an amplitude in azimuth angle characteristics of an x-value and a y-value is small, a curve of the x-axis and a curve of the y-value cross each other a number of times. In a liquid crystal panel having such characteristics, a tint varies largely depending upon a viewing angle, so sense of incompatibility is given to a viewer. As described above, the liquid crystal panels of the Examples of the present invention are excellent in both a contrast and a color shift, compared with those of the liquid crystal panels in the Comparative Examples.

REFERENCE EXAMPLE 1

Figure 17A:
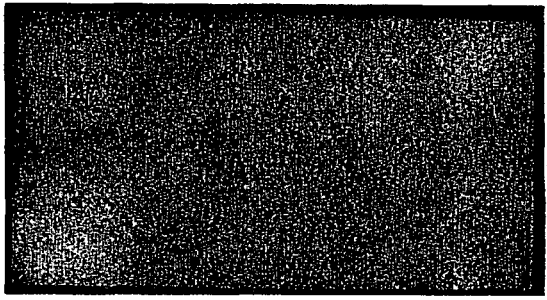
FIG. 17 Enlarged photographs of a screen in a black display in (a) the liquid crystal display apparatus produced in Example 1 and (b) the liquid crystal display apparatus produced in Comparative Example 6.
Figure 17B:
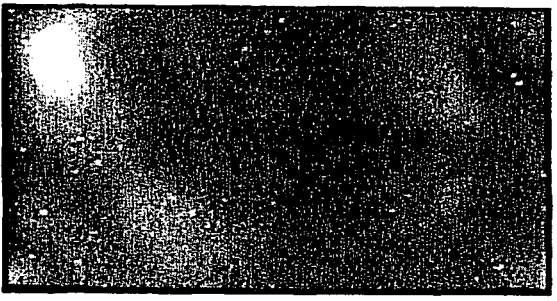

Screens in a black display in the liquid crystal display apparatus produced in Example 1 and the liquid crystal display apparatus produced in Comparative Example 6 were photographed. FIG. 17 show the photographs. As shown in FIG. 17, no unevenness (light leakage) was observed in the liquid crystal display apparatus of Example 1, while unevenness was observed over the entire screen in the liquid crystal display apparatus of Comparative Example 6, and hence, the liquid crystal display apparatus in Comparative Example 6 was not at a practical level. The unevenness observed in Comparative Example 6 is retardation unevenness caused by the tension at a time of attachment of each optical element, which is considered to be caused by the large photoelastic coefficient of a retardation film used therein.

REFERENCE EXAMPLE 2

Table 3 shows the photoelastic coefficient of a KA film used as a first optical compensation layer (third optical compensation layer) in Examples 1 to 5, the photoelastic coefficient of a polyester resin film used in Examples 6 and 7, and the photoelastic coefficient of a polycarbonate-based film having a positive birefringence and a negative refractive index wavelength dispersion used in Comparative Example 6.

TABLE 3

| | EXAMPLES 1 to 5 | EXAMPLES 6 and 7 | COMPARATIVE EXAMPLE 6 |
|---|---|---|---|
| PHOTOELASTIC COEFFICIENT ($10^{-12}$ m$^2$/N) | 25 | 50 | 61 |

As shown in Table 3, it is understood that the film used in Comparative Example 6 has a photoelastic coefficient larger than that of the film used in Examples 1 to 7. More specifically, as a photoelastic coefficient is larger, a retardation is expressed with a smaller force. Therefore, in the case where a retardation film having a large photoelastic coefficient is used, it is understood that unevenness is likely to occur due to a slight difference in tension at a time of attachment.

INDUSTRIAL APPLICABILITY

The liquid crystal panel of the present invention can contribute to the reduction in thickness, enhance viewing angle characteristics, express a high contrast, suppress a color shift, and satisfactorily prevent the light leakage in a black display.

The invention claimed is:

1. A liquid crystal panel, comprising:
    a liquid crystal cell having a liquid crystal layer containing liquid crystal molecules that are vertically aligned in an absence of a voltage;
    a first optical compensation layer having a relationship of Nz=1 to 2.5 and a relationship of $Re_1(380) < Re_1(550) < Re_1(780)$;
    a second optical compensation layer having a relationship of nx=ny>nz and a relationship of $Re_2(380) > Re_2(550) > Re_2(780)$;
    a first polarizer;
    a third optical compensation layer having a relationship of Nz=1 to 2.5 and a relationship of $Re_3(380) < Re_3(550) < Re_3(780)$;
    a fourth optical compensation layer having a relationship of nx=ny>nz and a relationship of $Re_4(380) > Re_4(550) > Re_4(780)$; and
    a second polarizer wherein:
    the first optical compensation layer, the second optical compensation layer, and the first polarizer are placed on one side of the liquid crystal cell;
    the third optical compensation layer, the fourth optical compensation layer, and the second polarizer are placed on the other side of the liquid crystal cell; and
    the first optical compensation layer and the second optical compensation layer, and the third optical compensation layer and the fourth optical compensation layer are placed in a symmetric positional relationship with respect to the liquid crystal cell.

2. A liquid crystal panel according to claim 1, wherein:
    the first optical compensation layer, the second optical compensation layer, and the first polarizer are placed on one side of the liquid crystal cell in the stated order from the liquid crystal cell; and
    the third optical compensation layer, the fourth optical compensation layer, and the second polarizer are placed on the other side of the liquid crystal cell in the stated order from the liquid crystal cell.

3. A liquid crystal panel according to claim 1, wherein:
    the second optical compensation layer, the first optical compensation layer, and the first polarizer are placed on one side of the liquid crystal cell in the stated order from the liquid crystal cell; and
    the fourth optical compensation layer, the third optical compensation layer, and the Second polarizer are placed on the other side of the liquid crystal cell in the stated order from the liquid crystal cell.

4. A liquid crystal panel according to claim 1, wherein the first optical compensation layer and the third optical compensation layer each have a photoelastic coefficient of $70 \times 10^{-12}$ (m$^2$/N) or less.

5. A liquid crystal panel according to claim 1, wherein the first optical compensation layer and the third optical compensation layer each have a relationship of Re(780)/Re(550)>1.1.

6. A liquid crystal panel according to claim 1, wherein the first optical compensation layer and the third optical compensation layer are formed of one of a cellulose-based material and a polyester-based material.

7. A liquid crystal panel according to claim 1, wherein the first optical compensation layer and the third optical compensation layer are formed of a material having a non-aromatic cyclic structure and an ester group.

8. A liquid crystal panel according to claim 1, wherein the second optical compensation layer and the fourth optical compensation layer each have a relationship of Re(780)/Re(550)<0.95.

9. A liquid crystal panel according to claim 1, wherein the second optical compensation layer and the fourth optical compensation layer each have a thickness direction retardation Rth of 20 nm or more.

10. A liquid crystal panel according to claim 1, wherein the first optical compensation layer and the third optical compensation layer are polymer films stretched in a width direction.

11. A liquid crystal display apparatus, comprising the liquid crystal panel according to claim 1.

* * * * *